United States Patent
Watanabe et al.

(10) Patent No.: US 6,882,608 B2
(45) Date of Patent: Apr. 19, 2005

(54) OPTICAL DISC CONTROLLER AND OPTICAL DISC APPARATUS USING THE SAME

(75) Inventors: Katsuya Watanabe, Nara (JP); Tatsuo Suzuki, Kyoto (JP); Akihiro Hatsusegawa, Kyoto (JP); Masanobu Takahashi, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 490 days.

(21) Appl. No.: 10/157,760

(22) Filed: May 29, 2002

(65) Prior Publication Data

US 2002/0181356 A1 Dec. 5, 2002

(30) Foreign Application Priority Data

Jun. 1, 2001 (JP) .................................. 2001-166579

(51) Int. Cl.[7] .............................. G11B 7/00; G11B 5/09
(52) U.S. Cl. ................. 369/47.32; 369/53.2; 369/53.35; 369/44.34
(58) Field of Search ..................... 369/47.32, 47.33, 369/47.34, 53.15, 53.16, 53.2, 53.21, 53.22, 53.31, 53.35, 53.26, 59.21, 59.23, 44.34

(56) References Cited

U.S. PATENT DOCUMENTS

| | | | | |
|---|---|---|---|---|
| 5,561,644 A | * | 10/1996 | Kondo | 369/47.4 |
| 5,587,981 A | * | 12/1996 | Kamatani | 369/53.2 |
| 5,606,536 A | | 2/1997 | Watanabe et al. | 369/44.36 |
| 5,841,739 A | * | 11/1998 | Iida et al. | 369/30.13 |
| 6,310,848 B1 | * | 10/2001 | Ueki | 369/47.33 |
| 6,538,967 B1 | * | 3/2003 | Lee | 369/47.46 |
| 6,760,287 B2 | * | 7/2004 | Sato | 369/47.53 |

* cited by examiner

*Primary Examiner*—Thang V. Tran
(74) *Attorney, Agent, or Firm*—Renner, Otto, Boisselle & Sklar, LLP

(57) ABSTRACT

An optical disc controller for controlling recording or reproduction of an optical disc includes: a rewritable memory for storing information necessary for recording or reproduction of the optical disc; a determination section for determining a class and type of the optical disc; a search section for searching for a region of the optical disc in which control information is recorded based on a determination result of the determination section; a reproduction section for reproducing the control information recorded in the region searched by the search section; and a memory control section for changing an arrangement of the memory based on at least one of the determination result and the control information reproduced by the reproduction section.

14 Claims, 26 Drawing Sheets

FIG. 5

| | Conventional | Embodiment 2 |
|---|---|---|
| 256 Kbyte | Reproduction information storage region (32Kbyte × 2 pages) | Reproduction information storage region (32Kbyte × 3 pages) |
| | Defect management information storage region (2Kbyte × 31) | Defect management information storage region (2Kbyte × 15) |
| | Information storage region for other information (130Kbyte) | Information storage region for other information (130Kbyte) |

OPTICAL DISC CONTROLLER AND OPTICAL DISC APPARATUS USING THE SAME

BACKGROUND OF THE INVENTION

1. Field of the Invention

The present invention relates to an optical disc controller for use in an optical disc apparatus which records information in, and/or reproduces information from, an optical disc using a semiconductor laser (red-color laser, blue-color laser, etc.) as a light source. More specifically, the present invention relates to an optical disc controller which determines the type of an optical disc mounted on an apparatus capable of recording information in, and/or reproducing information from, a plurality of types of optical discs having different physical structures and different logical structures, and which performs memory allocation (mapping) according to the determined type of the optical disc. The present invention also relates to an optical disc apparatus using such an optical disc controller.

2. Description of the Related Art

In recent years, studies and developments of digital versatile disc (DVD) technology, where compressed, digitalized image information can be recorded on a track of an optical disc as well as sound information, have been actively carried out. Examples of optical discs used for such DVD technology include, for example, DVD-ROM, DVD-R, DVD-RAM, or the like. These DVDs have different physical structures and different logical structures.

In an optical disc apparatus for recording information in and/or reproducing information from an optical disc, a signal recording surface of the rotating optical disc is irradiated with light from an optical pickup, such as a laser beam or the like. The light reflected by the signal recording surface of the optical disc is then detected by a light-receiving element of the optical pickup, in order to read a signal recorded in the optical disc, thereby generating reproduction information, such as image data or the like.

Conventional optical discs used for CD technology (CD-ROM, CD-R, CD-RW, etc.) have different logical structures but identical physical structures. Thus, recording or reproduction of information on a plurality of types of optical discs can be achieved by a common optical disc controller. However, optical discs used for DVD technology (DVD-ROM, DVD-R, DVD-RAM, etc.) have different physical structures and different logical structures. Therefore, for the purpose of recording/reproducing information on a plurality of types of optical discs using the same optical disc apparatus, it is necessary to incorporate different optical disc controllers exclusively used for respective physical structure types (CDs and DVDs), and process the different types of optical discs using different programs (firmware or $\mu$-code) so as to compensate for differences in the logical structure among the optical discs.

In an information recording or reproducing process, a central processing unit (CPU), which conducts communications with a host computer, controls the optical disk controller to perform a focusing control operation, a tracking control operation, a seeking operation of moving an optical pickup to an intended position for recording or reproduction of information, or the like, according to requests from the host computer. In a conventional optical disk apparatus, separate optical disc controllers are provided for different types of optical discs having different physical and logical structures which can be used with the optical disk apparatus.

Thus, it is necessary to rewrite a program for the CPU or replace the CPU with another new one according to the types of optical disc controllers and modifications to the specification (version upgrade or the like) of each type of disc. Therefore, in a conventional optical disc apparatus, it is necessary to provide an exclusive optical disc controller and resources, which are associated with a CPU corresponding to the optical disc controller, in accordance with the type of an optical disc which can be used in the optical disc apparatus.

However, in the case where reproduction compatibility or recording compatibility is established in a single optical disc apparatus for different types of optical discs based on DVD technology (DVD-ROM, DVD-R, DVD-RAM, etc.) in addition to optical discs based on conventional CD technology (CD-ROM, CD-R, CD-RW, etc.), even though optical discs usable in such an apparatus are limited to optical discs having a diameter of 12 cm, the amount of software for the CPU and the man-hour for development would increase, and more resources would be demanded for the same CPU and the same optical disc controller. Thus, such compatibility cannot be practically established based on a limited amount of resources. Adding more resources in order to establish such compatibility for different types of optical discs accordingly increases the production cost of the optical disc apparatus.

In an optical disc apparatus where a CPU controls an entire system thereof, in order to establish reproduction compatibility or recording compatibility, it is necessary to develop software for the CPU in accordance with the type of optical discs used. In such a case, a processing system for an optical device, which is standardized and marketed after production of the optical disc apparatus, is additionally installed in the optical disc apparatus. Thus, a processing system of the optical disc apparatus becomes complicated, and accordingly, the probability that a bug occurs in such a system is increased. Furthermore, even if an entire system structure of such an optical disc apparatus is reconsidered and reconstructed, the man-hour required for developing the software generally increases. Thus, the probability that a bug occurs in such a system is still high.

Thus, in the case where the number of types of optical discs supported by a single optical disc apparatus is increased, recording or reproduction processing for a conventionally-supported optical disc is adversely influenced, as well as that for a new type of optical disc, and as a result, the reliability of the optical disc apparatus decreases in many cases.

SUMMARY OF THE INVENTION

According to one aspect of the present invention, an optical disc controller for controlling recording or reproduction of an optical disc includes: a rewritable memory for storing information necessary for recording or reproduction of the optical disc; a determination section for determining a class and type of the optical disc; a search section for searching for a region of the optical disc in which control information is recorded based on a determination result of the determination section; a reproduction section for reproducing the control information recorded in the region searched by the search section; and a memory control section for changing an arrangement of the memory based on at least one of the determination result and the control information reproduced by the reproduction section.

In one embodiment of the present invention, the control information includes the control information necessary for reproduction of the optical disc; the optical disc controller further includes a reproduction information type determination section for determining a type of the control information necessary for reproduction of the optical disc; and the memory control section controls the reproduction section such that the control information necessary for reproduction of the optical disc is stored in the memory, based on a determination result of the reproduction information type determination section when a reproduction speed of the optical disc is lower than a predetermined speed.

In another embodiment of the present invention, the optical disc controller further includes an error measurement section for measuring an error rate, or the number of times of error correction, during reproduction of the control information, wherein the memory control section allocates a portion of the memory to a ring buffer which is set based on a measurement result of the error measurement section.

In still another embodiment of the present invention, the memory includes a first memory and a second memory, an access speed of the first memory being faster than that of the second memory; and the memory control section allocates the first memory to a storage region for the control information, and allocates the second memory to a ring buffer.

In still another embodiment of the present invention, the optical disc controller further includes: a general-purpose terminal which functions as an input terminal or output terminal; and a general-purpose terminal control section for controlling the general-purpose terminal, wherein the general-purpose terminal is connectable to a plurality of circuits, and the memory control section controls the general-purpose terminal control section such that the general-purpose terminal is connected to a certain one of the plurality of circuits based on the determination result.

In still another embodiment of the present invention, the optical disc controller further includes: a timer; and a timer control section for controlling the timer, wherein the memory control section controls the timer control section such that a time interval between timer counts of the timer, an interruption preset value, or a reset condition, is changed according to the determination result of the determination section.

In still another embodiment of the present invention, the reproduction section outputs the control information reproduced by the reproduction section to the memory according to the determination result.

In still another embodiment of the present invention, the optical disc controller further includes: an information connecting section for connecting a defect portion or discontinued portion of user data stored in the memory, wherein the control information includes defect management information for repairing the defect portion of the user data or linking information for repairing the discontinued portion of the user data, and the memory control section controls the information connecting section such that the discontinued portion of the user data is connected using the defect management information or the linking information.

In still another embodiment of the present invention, the optical disc controller further includes: an information complementing section for complementing an unrecorded portion of the user data, wherein the information complementing section complements the unrecorded portion of the user data with certain dummy information.

In still another embodiment of the present invention, the optical disc controller further includes: an information extraction section for extracting information from the memory, wherein the information extraction section extracts information from the memory according to the determination result or an instruction from a host controller connected to the optical disc controller.

In still another embodiment of the present invention, the optical disc stores information which is encrypted based on predetermined key information; and the optical disc controller further includes a decryption/decoding section for decrypting/decoding the encrypted information.

In still another embodiment of the present invention, the optical disc controller further includes: a comparison section for comparing the control information read from the optical disc with auxiliary control information which is previously set by a host controller connected to the optical disc controller, wherein if the control information matches with the auxiliary control information, the reproduction section reproduces the optical disc.

In still another embodiment of the present invention, the optical disc controller further includes: a sound selection section for selecting, according to an instruction from a host controller connected to the optical disc controller, sound information of a certain language from at least one sound information extracted from the memory; and a sound adjustment section for adjusting the sound information of the certain language selected by the sound selection section so as to have a desired volume/sound quality.

According to another aspect of the present invention, an optical disc apparatus includes: an optical pickup for emitting a light beam onto an optical disc and detecting a reflected light beam from the optical disc as a signal; a signal processing circuit for performing certain processing on the signal from the optical pickup; a servo circuit for moving the optical pickup; and the optical disc controller recited in any one of claims 1–13 for receiving a processed signal from the signal processing circuit and controlling the servo circuit according to the received signal.

Thus, the invention described herein makes possible the advantages of (1) enabling control of various types of optical discs using the same CPU or optical disc controller based on a limited mount of resources, and (2) providing a high-performance optical disc apparatus which operates with high reliability.

These and other advantages of the present invention will become apparent to those skilled in the art upon reading and understanding the following detailed description with reference to the accompanying figures.

BRIEF DESCRIPTION OF THE DRAWINGS

FIG. 5 shows an example of arrangement information (map) which indicates an arrangement of information stored in a variable memory in the case where reproduction information is data which only requires a low transfer rate.

DESCRIPTION OF THE PREFERRED EMBODIMENTS

Hereinafter, embodiments of the present invention will be described with reference to the drawings.

(Embodiment 1)

Figure 1:
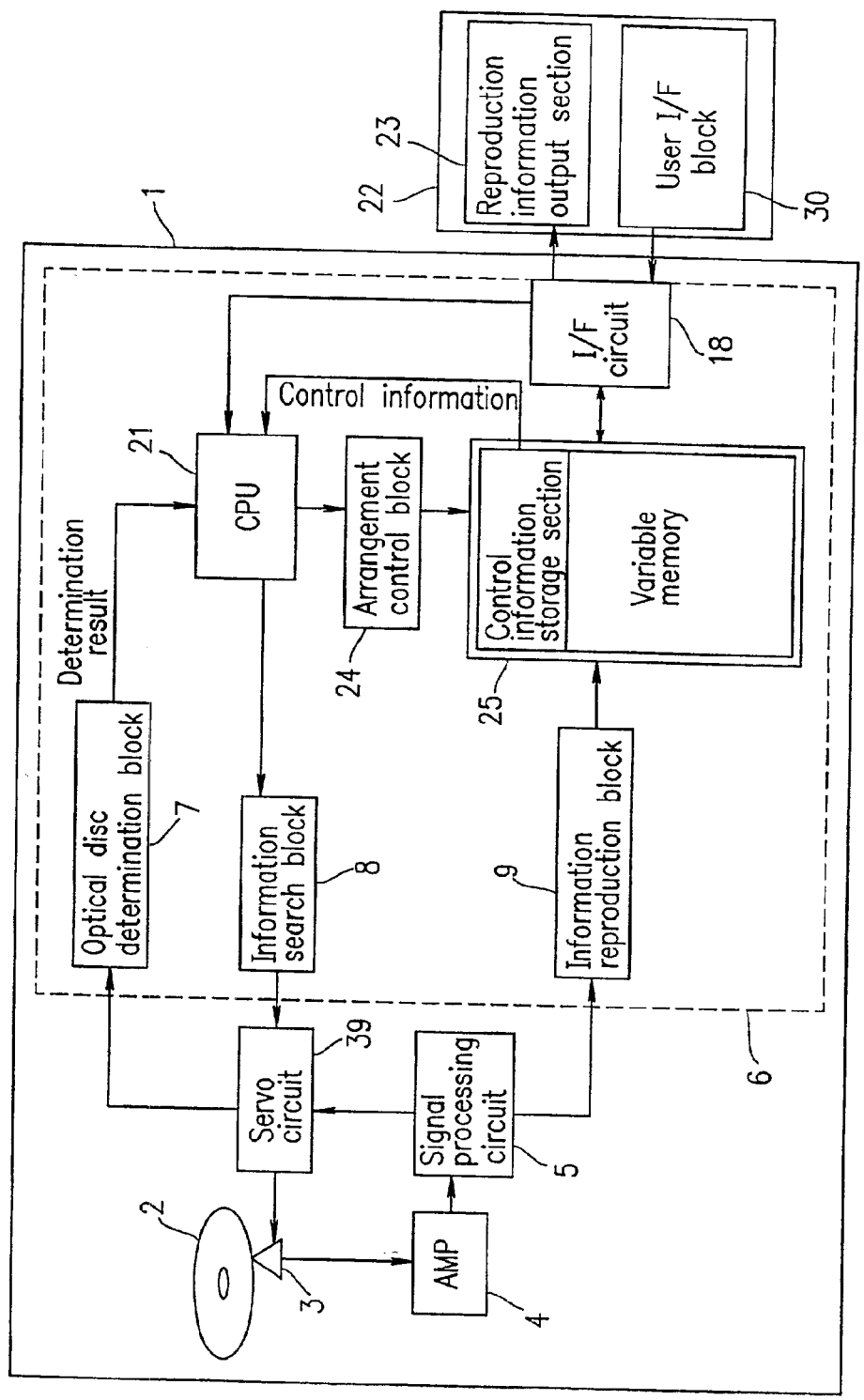
FIG. 1 shows a structure of an optical disc apparatus including an optical disc controller according to embodiment 1 of the present invention.

FIG. 1 shows a structure of an optical disc apparatus 1 including an optical disc controller 6 according to embodiment 1 of the present invention. The optical disc controller 6 controls a recording or reproduction of an optical disc.

The optical disc apparatus 1 is connectable to a host controller 22 including a reproduction information output section (output means) 23. The reproduction information output section 23 outputs sound, data, image, etc. The optical disc apparatus 1 further includes an optical disc controller 6. The optical disc controller 6 includes: a rewritable (variable) memory 25 for storing information necessary for recording or reproduction of an optical disc 2; an optical disc determination block (determination means) 7 for determining the class and type of an optical disc; an information search block (search means) 8 for searching in a region of an optical disc in which control information is recorded based on the determination result of the optical disc determination block 7; an information reproduction block (reproduction means) 9 for reproducing the control information recorded in the region searched by the information search block 8; and a CPU 21 and arrangement control block 24 for varying the arrangement of a memory based on at least one of the determination result of the optical disc determination block 7 or the control information reproduced by the information reproduction block 9. That is, the CPU 21 and the arrangement control block 24 cooperate as memory control means. In the example shown in FIG. 1, the CPU 21 and the arrangement control block 24 are separately provided but cooperate as memory control means. However, according to the present invention, the CPU 21 may have a function of the arrangement control block 24 and solely operates as memory control means. Alternatively, the arrangement control block 24 may solely operate as memory control means.

The optical disc apparatus 1 can perform reproduction of a plurality of types of optical discs having different physical and logical structures, such as DVD-ROM, DVD-R, DVD-RAM, etc. An optical pickup 3 incorporating a light source, such as a semiconductor laser or the like, emits a light beam onto a signal recording surface of the optical disc 2 which is rotated by a driving mechanism (not shown), such as spindle motor or the like. On the other hand, the optical pickup 3 receives a reflected light beams from the optical disc 2 by a photodetector (not shown) and detects the light beams as an electrical signal. A detection signal from the optical pickup 3 is amplified by an amplifier (AMP) 4 so as to have a predetermined amplitude.

The amplified signal from the AMP 4 is input to a signal processing circuit 5 which incorporates an adding circuit (not shown) and a differential circuit (not shown). The adding circuit generates an RF signal from the amplified signal using the quantity of total reflection as a reference. The differential circuit generates servo signals including a focus error signal, tracking error signal, or the like, from the amplified signal. The RF signal, which is a sum signal, passes through an equalizing circuit (not shown) for emphasizing only an RF signal band, and reaches the information reproduction block 9 in the optical disc controller 6. The servo signal, which is a difference signal, is sent to a servo circuit 39, and subjected to phase compensation and gain compensation, and thereafter subjected to current amplification. The resultant signal is output to an actuator incorporated in the optical pickup 3. With such a feedback, the optical pickup 3 is driven in a direction perpendicular to the information surface of the optical disc 2 (focusing direction) and in a direction traversing a spiral-like track on the information surface (tracking direction) such that the light beam accurately scans the track on the optical disc 2.

The RF signal input from the signal processing circuit 5 to the optical disc controller 6 is first binarized with reference to a predetermined slice level by a binary circuit (not shown) in the information reproduction block 9. The binarized signal is synchronized with a clock by a PLL circuit. The synchronized data is subjected to data extraction by use of a predetermined detection window generated by the clock. The extracted data is arranged as a data sequence in a two-dimensional arrangement or three-dimensional arrangement, and is subjected to error correction based on a predetermined generation polynomial. The error-corrected data is stored in the variable memory 25 by units of a block, and thereafter output to the reproduction information output section 23 of the host controller 22 via an I/F circuit 18 at a predetermined timing.

Next, a control method and arrangement method of the variable memory 25 corresponding to storage means, which is a primary part of embodiment 1 of the present invention, are described.

The servo circuit 39 measures the amplitudes of a tracking error signal (TE), a focus error signal (FE), a light quantity signal (AS), and an RF signal (RF), which have been generated by the signal processing circuit 5. The servo circuit 39 outputs the measured signals, or a combination signal (a comparison signal, a sum signal, a difference signal, multiplication signal, a division signal, or the like) produced from some of the measured signals, to the optical disc determination block 7 in the optical disc controller 6 as disc determination data.

The optical disc determination block 7 compares the determination data input from the servo circuit 39 with a preset level so as to determine the class and type of the optical disc 2 mounted on the optical disc apparatus 1. Herein, the "class" of an optical disc refers to a category of an optical disc, which is defined by the type of physical structure, such as DVD-ROM, DVD-R, DVD-RW, DVD-RAM, or the like. Herein, the "type" of an optical disc refers to information about the capacity of the optical disc defined based on a so-called Book Type, such as DVD-RAM 2.6G, DVD-RAM 4.7G, or the like, and information about the physical size of the optical disc, such as a 8 cm-disc, a 12 cm-disc, or the like.

The determination result of the optical disc determination block 7 is transmitted to the CPU 21. The CPU 21 determines a memory arrangement optimum for the optical disc 2 mounted on the optical disc apparatus 1. The determined memory arrangement is output to the arrangement control block 24 as an instruction signal, and based on this instruction signal, the variable memory 25 is actually arranged in the optimum arrangement. Thus, by using the optical disc controller 6 according to embodiment 1 of the present invention, the optical disc 2 mounted on the optical disc apparatus 1 can be stably reproduced at a high speed regardless of the class and type of the optical disc 2.

Furthermore, when the host controller 22 issues via a user I/F block 30 a command to read control information in a control track which is present, for example, in the innermost track of the optical disc 2, a search instruction and additional data thereto are transmitted to the information search block 8 via the I/F circuit 18 and CPU 21. Based on the search instruction and additional data thereto, the information search block 8 sends to the servo circuit 39 a start command and movement data (the number of tracks to be traversed), which instruct that the optical pickup 3 is to be moved from its current track position, where a state of a light beam spot is examined or where the light beam spot is currently scanning a track, to a desired position in the control track. The servo circuit 39 executes necessary processing according to the start command and the movement data from the information search block 8. For example, the servo circuit 39 produces a traversal drive signal for moving the optical pickup 3 in a radial direction of the optical disc 2 so as to seek a desired control track.

After the search operation is ended, control information of the control track is input to the variable memory 25 via the optical pickup 3, the AMP 4, the signal processing circuit 5, and the information reproduction block 9. The information input to the variable memory 25 is stored in a control information storage section which is provided at a predetermined position on the variable memory 25. The CPU 21 may refer to the stored control information and output an instruction to the arrangement control block 24 to establish an optimum arrangement of the variable memory 25. Thus, by using the optical disc controller 6 according to embodiment 1 of the present invention, the optical disc 2 mounted on the optical disc apparatus 1 can be stably reproduced at a high speed regardless of the class and type of the optical disc 2. Examples of the control information include defect management information for a DVD-RAM, linking information for a DVD-R/RW, etc.

Furthermore, it is preferable that control information for control data stored in the variable memory 25 be stored in a fixed position in the variable memory 25. Furthermore, when data such as the FE signal, AS signal, or the like, are used by the signal processing circuit 5 to determine the class or type of the optical disc 2, it is preferable that the determination result and input measured data be stored in the fixed position in the variable memory 25. With such preferable structures, even when the optical disc 2 is replaced with another one, newly-obtained determination data is compared with the stored data, whereby the class and the type of the replaced disc can be determined at a high accuracy. It should be noted that embodiment 1 of the present invention is not limited to the above described disc determination method nor the structures of the optical disc apparatus 1 and host controller 22.

The arrangement process of the variable memory 25 in the optical disc apparatus 1 using the optical disc controller 6 of embodiment 1 is described in more detail. Herein, consider an example where the classes of the optical discs 2 to be reproduced are DVD-ROM, DVD-RAM, and DVD-R.

Figure 2:
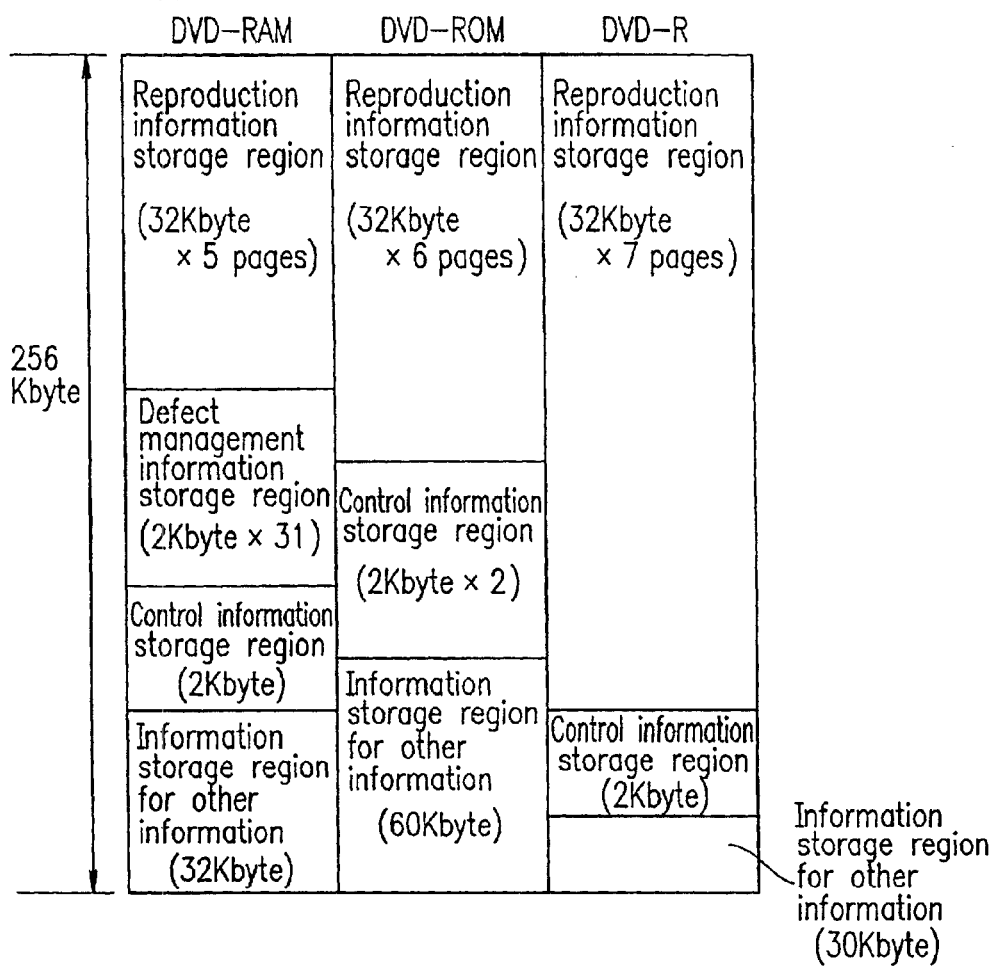
FIG. 2 shows an example of arrangement information (map) which indicates an arrangement of information stored in a variable memory according to a determination result of an optical disc determination block or control information.

FIG. 2 shows an example of arrangement information (map) which indicates an arrangement of information stored in the variable memory 25 according to the determination result of the optical disc determination block 7 or the control information. For clarity of illustration, in embodiment 1, the capacity of the variable memory 25 is 256 Kbytes in total.

For example, when the determination result indicates that the optical discs 2 is a DVD-RAM, it is necessary to store defect management information, and accordingly, a 62 Kbyte memory region is secured for a defect management information storage region. Since DVD-RAM is based on a sector structure and has excellent accessibility, a 160 Kbyte memory region is secured for a reproduction information storage region. A control information storage region for storing control information other than the defect management information occupies a 2 Kbyte memory region in each recording layer of the DVD-RAM. An information storage region for storing other information occupies a 32 Kbyte memory region. The size of the defect management information storage region can be changed according to the amount of the defect management information. For example, when the amount of the defect management information is small, the defect management information storage region can be reduced, and the reduced region can be reallocated to the other storage region.

When the determination result indicates that the optical disc 2 is a DVD-ROM, it is not necessary to perform defect management. On the other hand, processing which is to be performed at a higher speed, such as searching of information, copying of data into a hard disc, install of a program, etc., are demanded. Thus, a 192 Kbyte memory region is secured for a reproduction information storage region of the DVD-ROM, which is larger than that of the DVD-RAM. In DVD-ROMs, a 4 Kbyte memory region has to be secured for a control information storage region, which is two times larger than that of the DVD-RAM, because some DVD-ROMs have a two-layer structure. A 60 Kbyte memory region is allocated to an information storage region for storing other information. For example, management of a copyright unique to the DVD-ROM, or management of a regional code, can be achieved using this information storage region.

When the determination result indicates that the optical disc 2 is a DVD-R, it is preferable that a as large as possible memory region be secured for a reproduction information storage region. This is because the format structure of the DVD-R is basically designed in consideration that recording of data is performed in an incremental manner, and accordingly, random-accessibility of the DVD-R is poor. In the example shown in FIG. 2, a 224 Kbyte memory region is secured for the reproduction information storage region. Furthermore, a memory region of 2 Kbytes, which is equal to the amount of control information included in one recording layer of the DVD-R, is sufficient for the control information storage region. The remaining 30 Kbyte memory region is allocated to an information storage region for storing other information. If there is linking information which is another control information other than that described above, the size of the control information region is determined according to the size of the linking information.

As described above, by employing the above features of embodiment 1 of the present invention, an optimum memory arrangement can be automatically achieved according to the class and type of an optical disc, or control information thereof. Accordingly, a limited capacity of memory can be efficiently utilized according to the class and type of an optical disc, or control information thereof.

Figure 26:
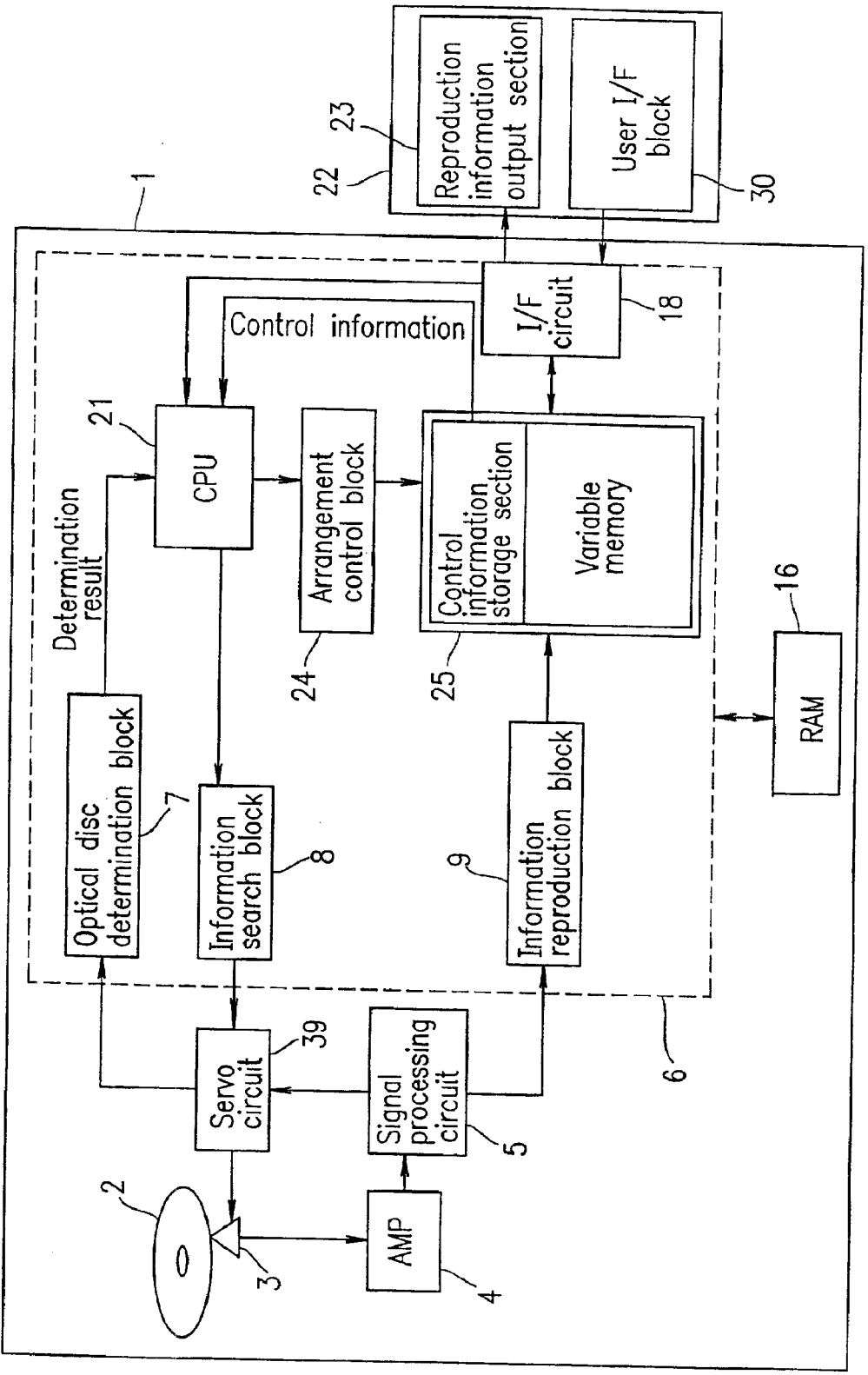
FIG. 26 shows a structure of an optical disc controller of the present invention to which an external RAM is connected.

Furthermore, assume a case where an external RAM 16 is connected to the optical disc controller 6 of the present invention as shown in FIG. 26. In such a structure, even when larger information, such as high-definition image information of a digital hi-vision system or the like, is processed at a higher speed in a large-capacity optical disc which is processed at a high transfer rate, which will be marketed in the future (for example, a High Definition DVD (HD-DVD)), a memory capacity can be efficiently utilized. For example, in currently-marketed DVDs, a transfer rate necessary for reproducing image information is about 5 Mbps on average, whereas it is about 32 Mbps on average in HD-DVDs. Thus, in order to continuously reproduce image information from a HD-DVD without interruption, the optical disc apparatus 1 requires a memory capacity about six times larger than that required for reproduction of a currently-marketed DVD, and therefore, the incorporated memory is not sufficient for that. In such a case, it is effective in achieving reproduction of a HD-DVD to employ the externally connected RAM 16. The total memory capacity including the capacity of the externally connected RAM 16 is set based on a time period from a time when tracking control and focusing control are out of order, to a time when buffering is resumed by reading desired data again after spin-up of the disc is restarted, whereby image information can be reproduced without interruption. Now, assume a case where, for example, the time required for restarting spin-up of the disc is 10 seconds, and the transfer rate is 32 Mbps. In this case, the following expression is satisfied:

$$32 \text{ Mbits} \times 10 \text{ seconds}/8 \text{ bit} = 40 \text{ MB}.$$

Thus, a memory having a capacity of 40 MB or more, e.g., a 64 MB general-purpose memory, needs to be incorporated in the optical disc apparatus 1.

As described above, it is very effective to connect the externally connected RAM 16 to the optical disc controller 6 of the present invention.

(Embodiment 2)

Figure 3:
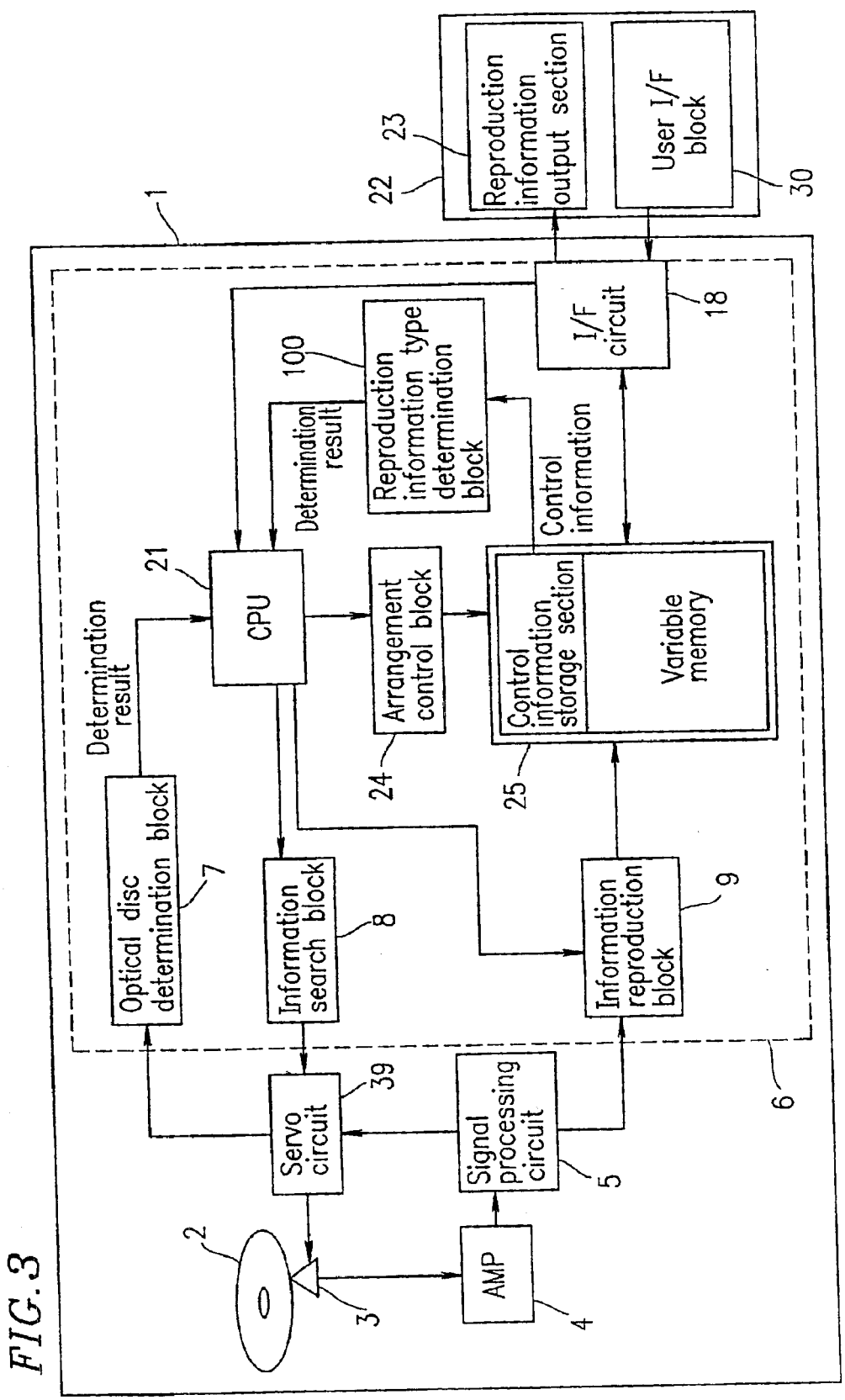
FIG. 3 shows a structure of an optical disc apparatus including an optical disc controller according to embodiment 2 of the present invention.

FIG. 3 shows a structure of an optical disc apparatus 1 according to embodiment 2 of the present invention. In FIG. 3, like elements are indicated by like reference numerals used in embodiment 1 of FIG. 1, and detailed descriptions thereof are omitted.

The structure of a reproduction information type determination block 100, which is a primary part of embodiment 2 of the present invention, is described below.

In embodiment 2, the optical disc controller 6 further includes the reproduction information type determination block (reproduction information type determination means) 100 for determining the type of control information required for reproduction. The CPU 21 and the arrangement control block 24 (memory control means) are structured so as to control the information reproduction block (reproduction means) 9 such that control information necessary for reproduction is stored in a memory based on the determination result of the reproduction information type determination block 100 when the reproduction speed of the optical disc 2 is lower than a predetermined speed.

When the host controller 22 issues via the user I/F block 30 a command to read control information associated with a control track in the innermost track of the optical disc 2, a search instruction and additional data thereto are transmitted from the host controller 22 to the information search block 8 via the I/F circuit 18 and CPU 21. Based on the search instruction and additional data thereto, the information search block 8 sends to the servo circuit 39 a seek command and movement data (the number of tracks to be traversed), which instruct that the optical pickup 3 is to be moved from a position of a track currently searched by a light beam spot to a desired position in the control track. The servo circuit 39 executes necessary processing according to a start command and the movement data from the information search block 8. For example, the servo circuit 39 produces a traversal drive signal for moving the optical pickup 3 in a radial direction of the optical disc 2 so as to seek a desired control track.

After the search operation is ended, control information of the control track is input to the variable memory 25 via the optical pickup 3, the AMP 4, the signal processing circuit 5, and the information reproduction block 9. The information input to the variable memory 25 is stored in a control information storage section which is provided at a predetermined position on the variable memory 25. Among the control information stored in the control information storage section, type information which indicates the type of information recorded in the optical disc 2 is output to the reproduction information type determination block 100. The reproduction information type determination block 100 determines the type of information recorded in the optical disc 2 based on the type information. Herein, the "type" refers to the type of reproduction information stored in an optical disc, such as serially stored VIDEO data or AUDIO data, or randomly stored ROM data, or the like. In addition, the information transfer rate can be determined using this type information.

The determination result of the reproduction information type determination block 100 is sent to the CPU 21. Based on the determination result of the reproduction information type determination block 100, the CPU 21 determines a memory arrangement optimum for the transfer rate necessary for transferring information from the optical disc 2 mounted on the optical disc apparatus 1. The determined memory arrangement is output as an instruction signal to the arrangement control block 24, and the variable memory 25 is actually arranged in the determined optimum arrangement. Thus, the optical disc apparatus 1 of the present invention can stably reproduce information from the optical disc 2 at a high speed regardless of the transfer rate of the information recorded in the optical disc 2. Furthermore, it is preferable that control information other than reproduction information stored in the variable memory 25 as a buffer, such as control data or the like, be stored in a fixed position in the variable memory 25 which is never rearranged.

Alternatively, a memory arrangement optimum for the optical disc 2 mounted on the optical disc apparatus 1 may be determined based on not only the determination result of the reproduction information type determination block 100 but also on the determination result of the optical disc determination block 7 in combination.

Now, a processing operation for determining a memory arrangement is described in more detail for a case where the optical disc 2 mounted on the optical disc apparatus 1 contains a VIDEO data, and for a case where the optical disc 2 mounted on the optical disc apparatus 1 contains a ROM data.

Figure 4:
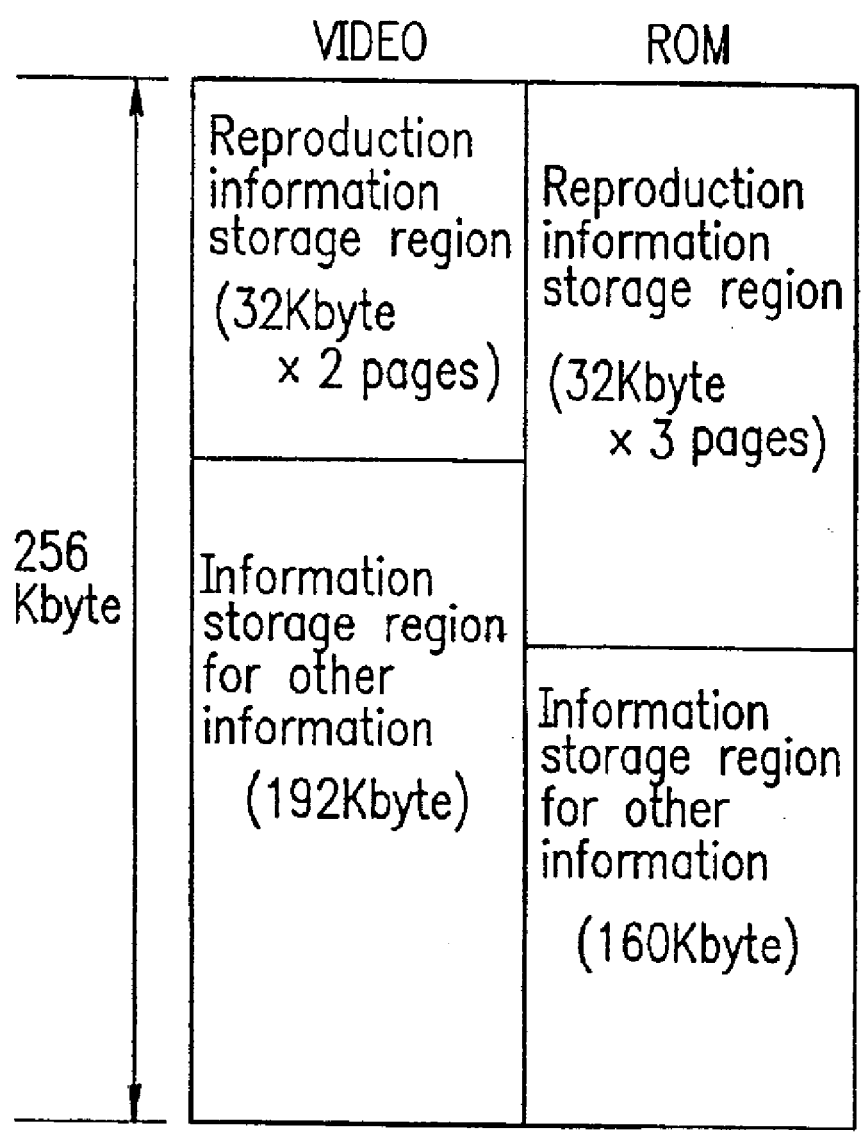
FIG. 4 shows an example of arrangement information (map) which indicates an arrangement of information stored in a variable memory according to a determination result of a reproduction information type determination block.

FIG. 4 shows an example of arrangement information (map) which indicates an arrangement of information stored in the variable memory 25 according to the determination result of the reproduction information type determination block 100. For clarity of illustration, in embodiment 2, the capacity of the variable memory 25 is 256 Kbytes in total.

For example, when the type of reproduction information recorded in the optical disc 2 is found to be VIDEO data which only requires a low transfer rate, a sufficient number of buffer pages (reproduction information storage region) used in a sequential reading operation of reproduction information is 2 pages (64 Kbytes). This is because the transfer rate secured for reading information from the optical disc 2 is two times or more higher than a host transfer rate. In the case where, after data from the optical disc 2 is subjected to demodulation and ECC processes performed in the buffer pages and output to a host, new data is then introduced into the emptied buffer, no delay is caused in the operation timings. However, a memory region of 2 pages (64 Kbytes) is secured for the reproduction information storage region in view of an error-retry process or the like. As a result, a 192 Kbyte memory region can be secured for storage region for storing other control information or the like. This region can store navigation information or control information for a superimposed subtitle, sound, etc., and accordingly is very useful in video reproduction.

However, when the type of reproduction information recorded in the optical disc 2 is found to be ROM data which requires high-speed reproduction, the number of buffer pages (reproduction information storage region) used in a sequential reading operation of reproduction information is at least 3 pages (96 Kbytes). This is because a time required for data transfer is substantially equal to each of the times required for the demodulation and ECC processes. By separately performing the demodulation, ECC, and data transfer operations, a decrease in the data transfer rate which may be caused due to the demodulation and ECC processes can be prevented. Furthermore, in the case of ROM data, the amount of effective control information is small, hence a 160 Kbyte memory region is sufficient for the storage region for storing other control information. Thus, in this example shown in FIG. 4, the arrangement control block 24 secures a 160 Kbyte memory region for the storage region for storing other control information.

As described above, by employing the above features of embodiment 2 of the present invention, an optimum memory arrangement can be automatically achieved according to the type of reproduction information which is included in control information stored in an optical disc. Accordingly, a limited capacity of memory can be efficiently utilized according to the type of reproduction information stored in the optical disc.

Next, arrangement processing of the variable memory 25 in the optical disc apparatus 1 according to embodiment 2 is described in more detail. Herein, consider an example where an rewritable optical disc contains reproduction information which only requires a low transfer rate, such as VIDEO data.

FIG. 5 shows an example of arrangement information (map) which indicates an arrangement of information stored in the variable memory 25 in the case where the reproduction information type determination block 100 determines that the reproduction information is data which only requires a low transfer rate, such as VIDEO data. For clarity of illustration, the capacity of the variable memory 25 is 256 Kbytes in total. Further, a difference between a conventional mapping and a mapping of embodiment 2 are compared in respect to the defect management information which is required in reproduction of a DVD-RAM.

In a DVD-RAM, the defect management regions are present in both the innermost track and the outermost track. In a conventional reproduction technique, reproduction of defect management information is started after all the defect management information has been acquired from the optical disc 2. According to the present invention, if the type of reproduction information is VIDEO data which only requires a low reproduction speed, and the optical disc 2 contains a plurality of contents or programs, the method of reproduction processing is switched between a case where a selected content is present in an inner track and a case where the selected content is present in an outer track.

For example, the type of the optical disc 2 is a DVD-RAM, defect management information required in a reproduction process (62 Kbytes) is acquired from the optical disc 2 in such a manner that, in a sequential reading operation on the inner track, only the defect management information required for reproduction of data from the inner track (e.g., 30 Kbytes) is acquired, whereas in a sequential reading operation on the outer track, only the defect management information required for reproduction of data from the outer track (e.g., 30 Kbytes) is acquired. Based on the thus-acquired defect management information, a designated content is reproduced.

When there is a sufficient time for a preread operation of prereading a reproduction information, only defect management information required for reproduction of data from the inner track (e.g., 30 Kbytes) is first acquired. Thereafter, while the sequential reading operation advances from the inner track toward the outer track, defect management information required for an intermediate track, and defect management information required for the outer track, are additionally acquired and written over the defect management information used for reproduction of data from the inner track, in a sequential manner.

According to such a procedure, a 96 Kbyte memory region can be secured for the reproduction information storage region as shown in FIG. 5. As a result, the performance of the optical disc apparatus 1 can be improved.

The above-described procedure for the defect management information can be applied similarly to a case where the type of reproduction information is linking information which is required in reproduction of a DVD-R/RW. In a sequential reading operation on the inner track, only linking information required for reproduction of data from the inner track is acquired. Thereafter, while the sequential reading operation advances toward the outer track, linking information required for the respective contents stored in intermediate tracks are additionally acquired and written over the linking information used for reproduction of data from the inner track in a sequential manner.

Furthermore, when the optical disc 2 is a DVD-R/RW, the following procedure is possible. Border information, which is required in reproduction of multi-border information, is first acquired in the form of a single border. Then, during a sequential read operation of the single border, border information required for subsequent sequential read operations are sequentially acquired and written over the previously-used border information.

As described above, by employing the above features of embodiment 2 of the present invention, control information, such as defect management information, linking information, and border information, or the like, all of which are acquired at the startup of the optical disc apparatus 1, can be acquired during a reproduction operation of reproduction information, and accordingly, the startup time of the optical disc apparatus 1 can be reduced.

Furthermore, by employing the above features of embodiment 2 of the present invention, a storage region for storing defect management information, linking information, or border information can be reduced. The reduced region can be allocated to a buffer memory (reproduction information storage region). Accordingly, a preread operation of greater amount of data can be performed in the enlarged buffer memory, and therefore, such a structure is very effective in reproduction of data.

(Embodiment 3)

Figure 6:
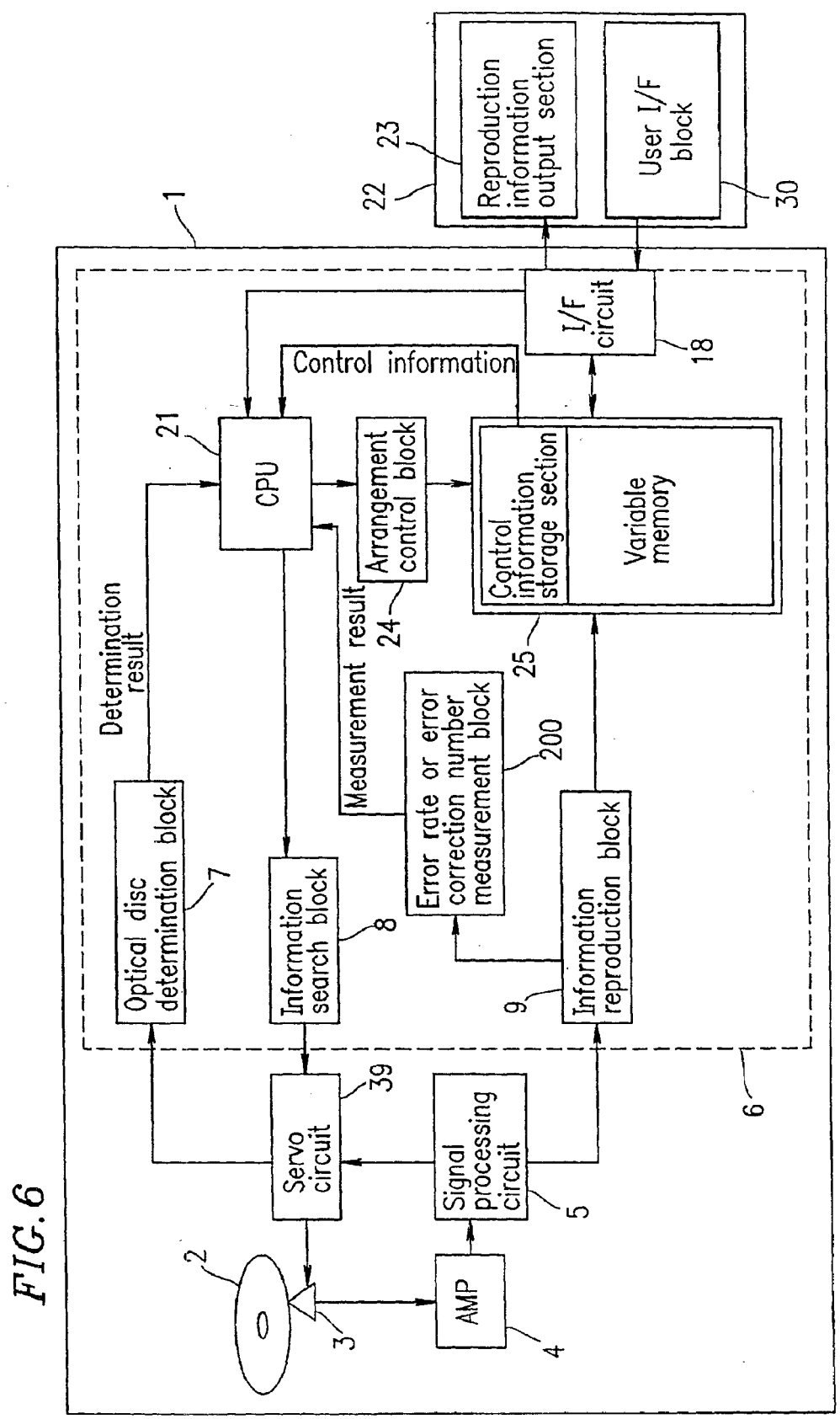
FIG. 6 shows a structure of an optical disc apparatus including an optical disc controller according to embodiment 3 of the present invention.

FIG. 6 shows a structure of an optical disc apparatus 1 including an optical disc controller 6 according to embodiment 3 of the present invention. The optical disc controller 6 controls recording or reproduction of data on an optical disc. Elements shown in embodiment 3 are the same as those of FIG. 1 of embodiment 1 except for an error rate or error correction number measurement block 200, and therefore, detailed descriptions thereof are herein omitted.

The structure of the error rate or error correction number measurement block 200, which is a primary part of embodiment 3 of the present invention, is described below.

In embodiment 3, the optical disc controller 6 further includes the error rate or error correction number measurement block (error measurement means) 200 for measuring the error rate or the number of times of error correction during reproduction of control information. The CPU 21 and the arrangement control block 24 (memory control means) allocate a portion of a memory to a ring buffer which is set based on a measurement result of the error rate or error correction number measurement block 200.

When the host controller 22 issues via the user I/F block 30 a command to read reproduction information stored in any position on the optical disc 2, a search instruction and additional data thereto are transmitted from the host controller 22 to the information search block 8 via the I/F circuit 18 and CPU 21. Based on the search instruction and additional data thereto, the information search block 8 sends to the servo circuit 39 a start command and movement data (the number of tracks to be traversed), which instruct that the optical pickup 3 is to be moved from its current track position, where a state of a light beam spot is examined or where the light beam spot is currently scanning a track, to a desired position in a control track. The servo circuit 39 executes necessary processing according to the start command and the movement data from the CPU 21. For example, the servo circuit 39 produces a traversal drive signal for moving the optical pickup 3 in a radial direction of the optical disc 2 so as to seek the desired position on the control track.

After the search operation is ended, reproduction information is input to the optical disc controller 6 via the optical pickup 3, the AMP 4, and the signal processing circuit 5. The reproduction information input to the optical disc controller 6 is first binarized with reference to a predetermined slice level by a binary circuit (not shown) in the information reproduction block 9. The binarized signal is synchronized with a clock by a PLL circuit. The synchronized data is subjected to data extraction by use of a predetermined detection window generated by the clock. The extracted data is arranged as a data sequence in a two-dimensional arrangement or three-dimensional arrangement, and is subjected to error correction based on a predetermined generation polynomial. The error-corrected data is stored in the variable memory 25 by units of a block, and thereafter output to the reproduction information output section 23 of the host controller 22 via an I/F circuit 18 at a predetermined timing.

Information about error correction which is obtained in the information reproduction block 9 is input to the error rate or error correction number measurement block (error measurement means) 200 which measures the error rate for reproduction information or the number of times of error correction for reproduction information.

A measurement result of the error rate or error correction number measurement block 200 is transmitted to the CPU 21. Based on the determination-result of the error rate or error correction number measurement block 200, the CPU 21 determines a memory arrangement optimum for the optical disc 2 mounted on the optical disc apparatus 1. The determined memory arrangement is output as an instruction signal to the arrangement control block 24, and the variable memory 25 is actually arranged in the determined optimum arrangement.

Next, arrangement processing of the variable memory 25 in the optical disc apparatus 1 according to embodiment 3 is described in more detail. Herein, consider an example where a portion of the variable memory 25 is used as a ring buffer, and the size of the ring buffer can be varied according to the error rate or the number of times of error correction for reproduction information obtained from the optical disc 2 via the information reproduction block 9.

Figure 7:
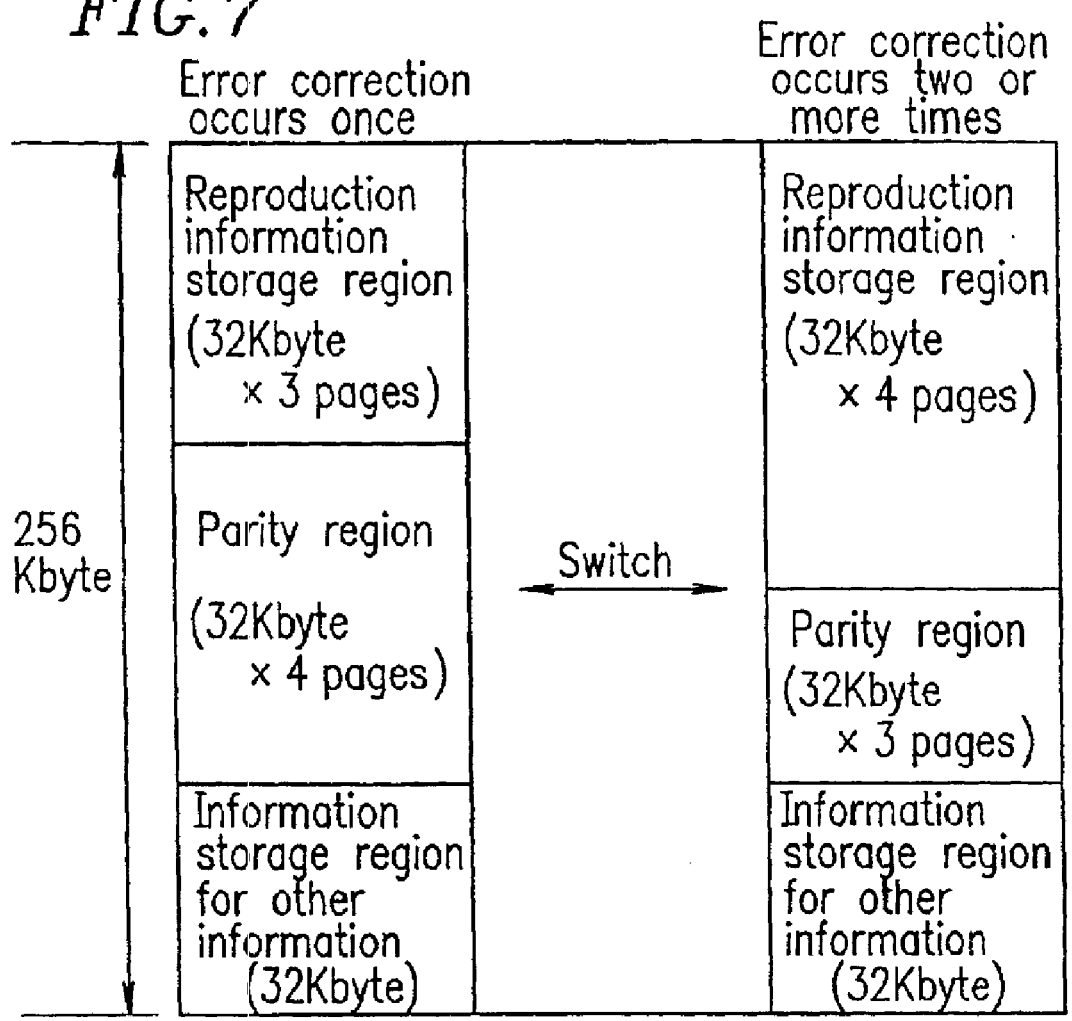
FIG. 7 shows an example of arrangement information (map) which indicates an arrangement of information stored in a variable memory in the case where a portion of the variable memory is used as a ring buffer, and the size of the ring buffer can be varied according to an error rate or the number of times of error correction for reproduction information obtained from an optical disc via an information reproduction block.

FIG. 7 shows an example of arrangement information (map) which indicates an arrangement of information stored in the variable memory 25 in the case where a portion of the variable memory 25 is used as a ring buffer, and the size of the ring buffer can be varied according to the error rate or the number of times of error correction for reproduction information obtained from the optical disc 2 via the information reproduction block 9. For clarity of illustration, the capacity of the variable memory 25 is 256 Kbytes in total.

For example, in the ring buffer, the size (number of pages) of a parity region used for error correction of buffered reproduction information is switched according to the error rate or the number of times of error correction for the buffered reproduction information.

For example, now assume a case where, in a high-speed reproduction operation of the optical disc controller 6, the number of times of error correction for buffering data (reproduction information) of 1 ECC block (corresponding to one page, i.e., 32 Kbytes) is 1; the error rate where error correction can be completed by a single error correction operation is lower than 0.5%; and one page of the parity region which is required for a single error correction operation is 32 Kbytes. In the case where the number of times of error correction for buffering data (reproduction information) of 1 ECC block is 1, or the error rate is lower than 0.5%, a parity region having a size of 3 pages (96 Kbytes), which is the minimum size required for high-speed reproduction, is secured.

In the case where the number of times of error correction for buffering data (reproduction information) is 2 or more, or the error rate is equal to or higher than 0.5%, one page is added to the parity region so as to secure 4 pages (128 Kbytes) for the parity region.

By employing the above features of embodiment 3 of the present invention, a parity region overflow which may occur during a sequential read operation can be avoided even when an optical disc with poor readability, such as an optical disc having scratches on its surface. Therefore, a decrease in the transfer rate can be prevented.

Furthermore, in the case where an error correction operation needs to be performed only one time, a decreased number of pages of the parity region can be used as a reproduction information (buffering data) storage region. In this case, the number of pages which are available to a preread operation can be increased. Therefore, the memory can be efficiently utilized.

(Embodiment 4)

Figure 8:
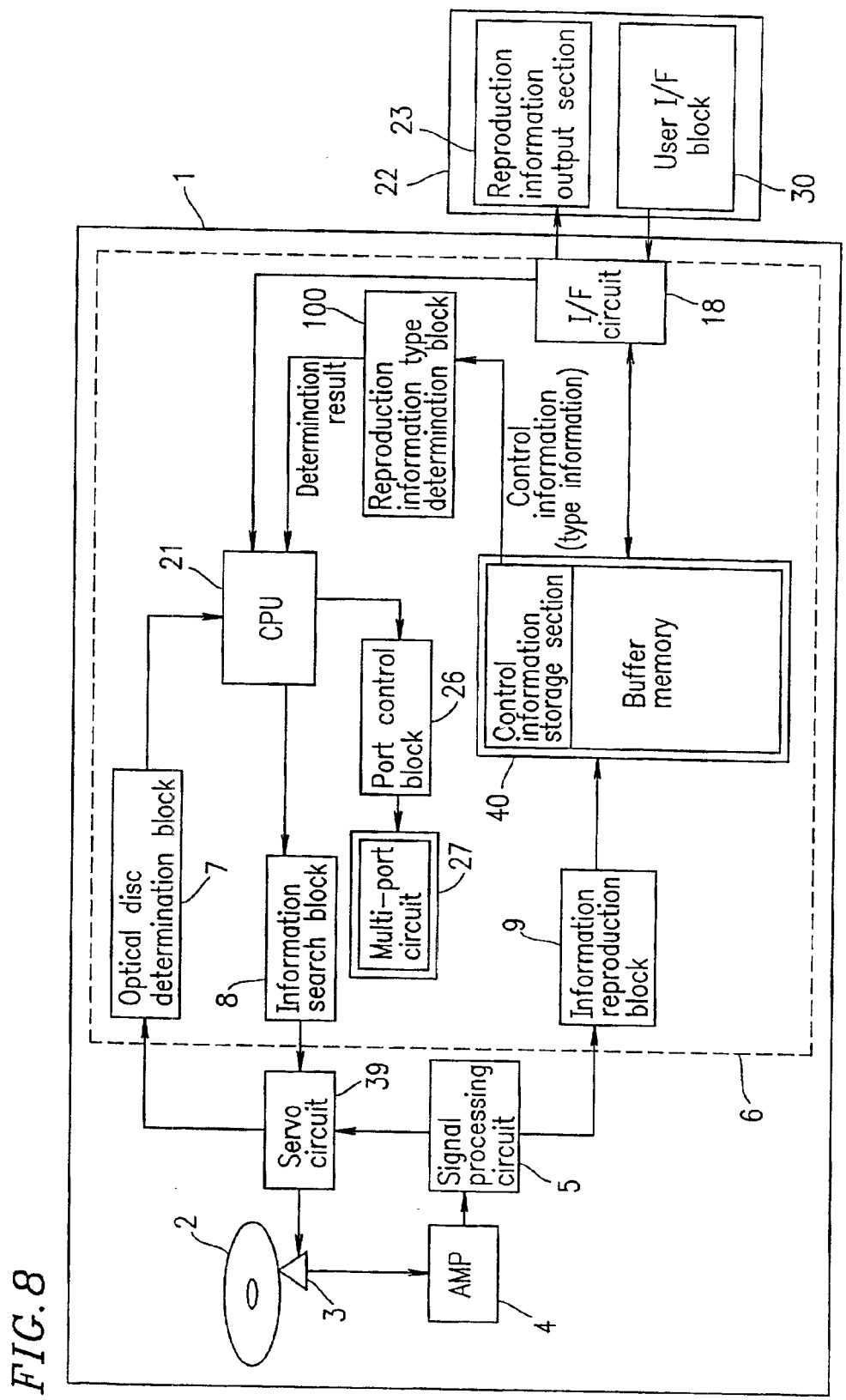
FIG. 8 shows a structure of an optical disc apparatus including an optical disc controller according to embodiment 4 of the present invention.

FIG. 8 shows a structure of an optical disc apparatus 1 including an optical disc controller 6 according to embodiment 4 of the present invention. The optical disc controller 6 controls recording or reproduction of data on an optical disc. In FIG. 8, like elements are indicated by like reference numerals used in embodiment 1 of FIG. 1, and detailed descriptions thereof are omitted. In embodiment 4, a "port" refers to a general-purpose terminal which functions as an input or output terminal. A buffer memory 40 of embodiment 4 shown in FIG. 8 has a function equivalent to that of the variable memory 25 of embodiment 1. However, the buffer memory 40 does not necessarily need to be variable.

A port control method used for a multi-port circuit, which is an essential part of embodiment 4, is described below.

For example, in order to obtain control information from a control track which is present in the innermost track of the optical disc 2, the information search block 8 sends to the servo circuit 39 a start command and movement data (the number of tracks to be traversed), which instruct that the optical pickup 3 is to be moved from its current track position, where a state of a light beam spot is examined or where the light beam spot is currently scanning a track, to a desired position in a control track. The servo circuit 39 executes necessary processing according to the start command and the movement data from the CPU 21. For example, the servo circuit 39 produces a traversal drive signal for moving the optical pickup 3 in a radial direction of the optical disc 2 so as to seek the desired position on the control track.

After the search operation is ended, the control information of the control track is input to the buffer memory 40 via the optical pickup 3, the AMP 4, the signal processing circuit 5, and the information reproduction block 9. The control information input to the buffer memory 40 is stored in a control information storage section which is present at a predetermined position in the buffer memory 40. Among the control information is stored in the control information storage section, type information which indicates the type of reproduction information recorded in the optical disc 2 is output to the reproduction information type determination block 100. The reproduction information type determination block 100 determines the type of reproduction information recorded in the optical disc 2 based on the type information input to the reproduction information type determination block 100. Herein, the "type information" refers to information about the type of reproduction information stored in an optical disc, such as VIDEO data, AUDIO data, ROM data, or the like.

The determination result of the reproduction information type determination block 100 is sent to the CPU 21. Based on the determination result of the reproduction information type determination block 100, the CPU 21 determines an optimum port setting (i.e., information for setting a signal to be transmitted to a general-purpose terminal according to the determination result of the reproduction information type determination block 100). The determined port setting is output as an instruction signal to a port control block 26, and a multi-port circuit 27 is optimally set based on the instruction signal. Thus, the optical disc apparatus 1 of the present invention can stably reproduce information from the optical disc 2 at a high speed.

Next, port setting of the multi-port circuit 27 in the optical disc apparatus 1 according to embodiment 4 is described in more detail. Herein, consider an example where the type of reproduction information stored in the optical disc 2 is VIDEO data, and an example where the type of reproduction information stored in the optical disc 2 is ROM data.

Figure 9:
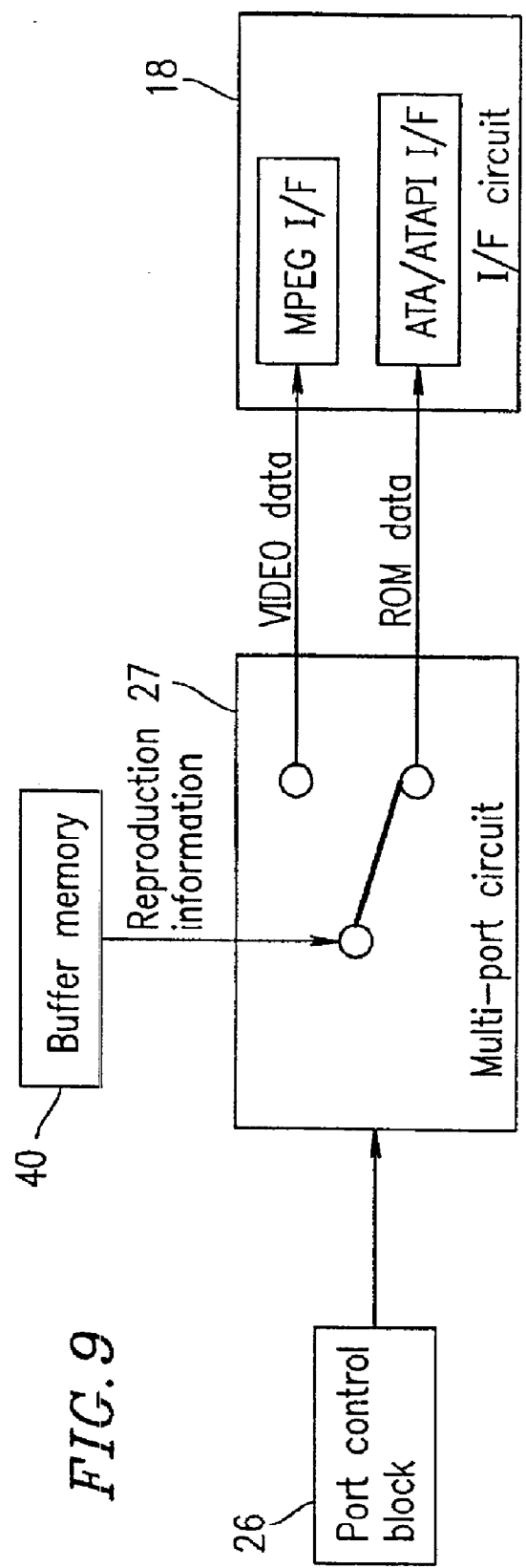
FIG. 9 shows an example of port setting of a multi-port circuit which is set according to a determination result of a reproduction information type determination block.

FIG. 9 shows an example of port setting of the multi-port circuit 27 which is set according to the determination result of the reproduction information type determination block 100.

When it is determined that the type of reproduction information stored in the optical disc 2 is data which only requires a low reproduction speed, such as VIDEO data or the like, a terminal of the I/F circuit 18 from which reproduction information is output to the host controller 22 is switched to an MPEG I/F terminal in the I/F circuit 18 which is provided for image reproduction.

When it is determined that the type of reproduction information stored in the optical disc 2 is data which requires a high reproduction speed, such as ROM data or the like, a terminal of the I/F circuit 18 from which reproduction information is output to the host controller 22 is switched to an ATA/ATAPI I/F terminal in the I/F circuit 18 which is provided for data transmission/reception.

With the above features of embodiment 4, even when the optical disc 2 has a partial ROM structure where the innermost track of the optical disc 2 includes a ROM data storage region and the outermost track includes a VIDEO data storage region, or where the first layer includes a VIDEO data storage region and the second layer includes a ROM data storage region, information about a control track and boundary addresses of each of the storage regions can be obtained at a high speed. Switching among the respective storage regions can be smoothly achieved without interrupting a reproduction operation, and accordingly, accessibility to the optical disc 2 can be improved.

As described above, by employing the above features of embodiment 4 of the present invention, switching of a general-purpose terminal can be automatically achieved according to the type of reproduction information stored in an optical disc, and a necessary signal can be transmitted efficiently according to the type of reproduction information stored in the optical disc. Furthermore, a highly-functional optical disc controller having a small number of terminals can be realized at a low cost.

(Embodiment 5)

Figure 10:
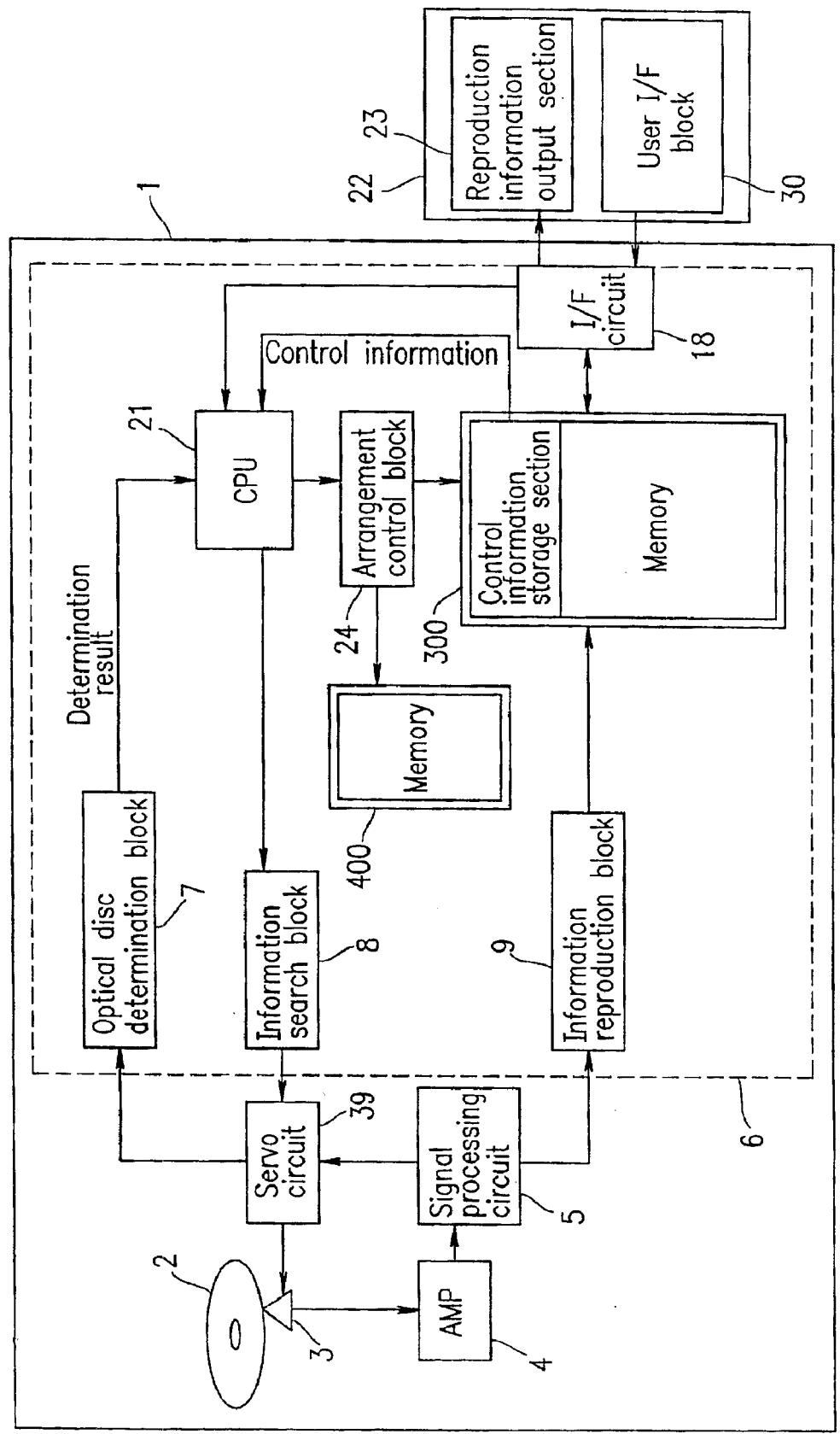
FIG. 10 shows a structure of an optical disc apparatus including an optical disc controller according to embodiment 5 of the present invention.

FIG. 10 shows a structure of an optical disc apparatus 1 including an optical disc controller 6 according to embodiment 5 of the present invention. The optical disc controller 6 controls recording or reproduction of data on an optical disc. In FIG. 10, like elements are indicated by like reference numerals used in embodiment 1 of FIG. 1, and detailed descriptions thereof are omitted.

Memories 300 and 400, which are primary parts of embodiment 5, are described below.

In embodiment 5, the memory includes a first memory (memory 300) and a second memory (memory 400). In this example, the accessing speed of the first memory is higher than that of the second memory. The CPU 21 and the arrangement control block 24 (memory control means) designate the first memory as a storage region for storing control information and the second memory as a ring buffer.

The servo circuit 39 measures the amplitudes of a tracking error signal (TE), a focus error signal (FE), a light quantity signal (AS), and an RF signal (RF), which have been generated and processed by the signal processing circuit 5. The servo circuit 39 outputs the measured signals, or a combination signal (a comparison signal, a sum signal, a difference signal, multiplication signal, a division signal, or the like) produced from some of the measured signals, to the optical disc determination block 7 in the optical disc controller 6 as disc determination data.

The optical disc determination block 7 compares the determination data input from the servo circuit 39 with a preset level so as to determine the class and type of the optical disc 2 mounted on the optical disc apparatus 1. Herein, the "class" of an optical disc refers to a category of an optical disc, which is defined by the type of physical structure, such as DVD-ROM, DVD-R, DVD-RW, DVD-RAM, or the like. Herein, the "type" of an optical disc refers to information about the capacity of the optical disc defined based on a so-called Book Type, such as DVD-RAM 2.6G, DVD-RAM 4.7G, or the like, and information about the physical size of the optical disc, such as a 8 cm-disc, a 12 cm-disc, or the like.

The determination result of the optical disc determination block 7 is transmitted to the CPU 21. The CPU 21 determines a memory arrangement optimum for the optical disc 2 mounted on the optical disc apparatus 1. The determined memory arrangement is output to the arrangement control block 24 as an instruction signal, and based on this instruction signal, the memories 300 and 400 are actually arranged in the optimum arrangement. Thus, by using the optical disc controller 6 according to embodiment 5 of the present invention, the optical disc 2 mounted on the optical disc apparatus 1 can be stably reproduced at a high speed regardless of the class and type of the optical disc 2.

When the host controller 22 issues via the user I/F block 30 a command to read control information stored in a control track which is present on the innermost track the optical disc 2, a search instruction and additional data thereto are transmitted from the host controller 22 to the information search block 8 via the I/F circuit 18 and CPU 21. Based on the search instruction and additional data thereto, the information search block 8 sends to the servo circuit 39 a start command and movement data (the number of tracks to be traversed), which instruct that the optical pickup 3 is to be moved from its current track position, where a state of a light beam spot is examined or where the light beam spot is currently scanning a track, to a desired position in the control track. The servo circuit 39 executes necessary processing according to the start command and the movement data from the CPU 21. For example, the servo circuit 39 produces a traversal drive signal for moving the optical pickup 3 in a radial direction of the optical disc 2 so as to seek the desired position on the control track.

After the search operation is ended, control information of the control track is input to the memory 300 via the optical pickup 3, the AMP 4, the signal processing circuit 5, and the information reproduction block 9. In the example shown in FIG. 10, the control information is input to the memory 300. However, according to the present invention, the control information may be input to the memory 400. The information input to the memory 300 is stored in a control information storage section which is provided at a predetermined position on the memory 300. The CPU 21 may refer to the stored control information and output an instruction to the arrangement control block 24 to establish an optimum arrangement of the memories 300 and 400. Thus, by using the optical disc controller 6 according to embodiment 5 of the present invention, the optical disc 2 mounted on the optical disc apparatus 1 can be stably reproduced at a high speed regardless of the class and type of the optical disc 2. Examples of the control information include defect management information for a DVD-RAM, linking information for a DVD-R/RW, etc.

Next, the arrangement process of the memory 300 or 400 in the optical disc apparatus 1 using the optical disc controller 6 of embodiment 5 is described in more detail. Herein, consider an example where the classes of the optical discs 2 to be reproduced are DVD-ROM, DVD-RAM, and DVD-R.

Figure 11:
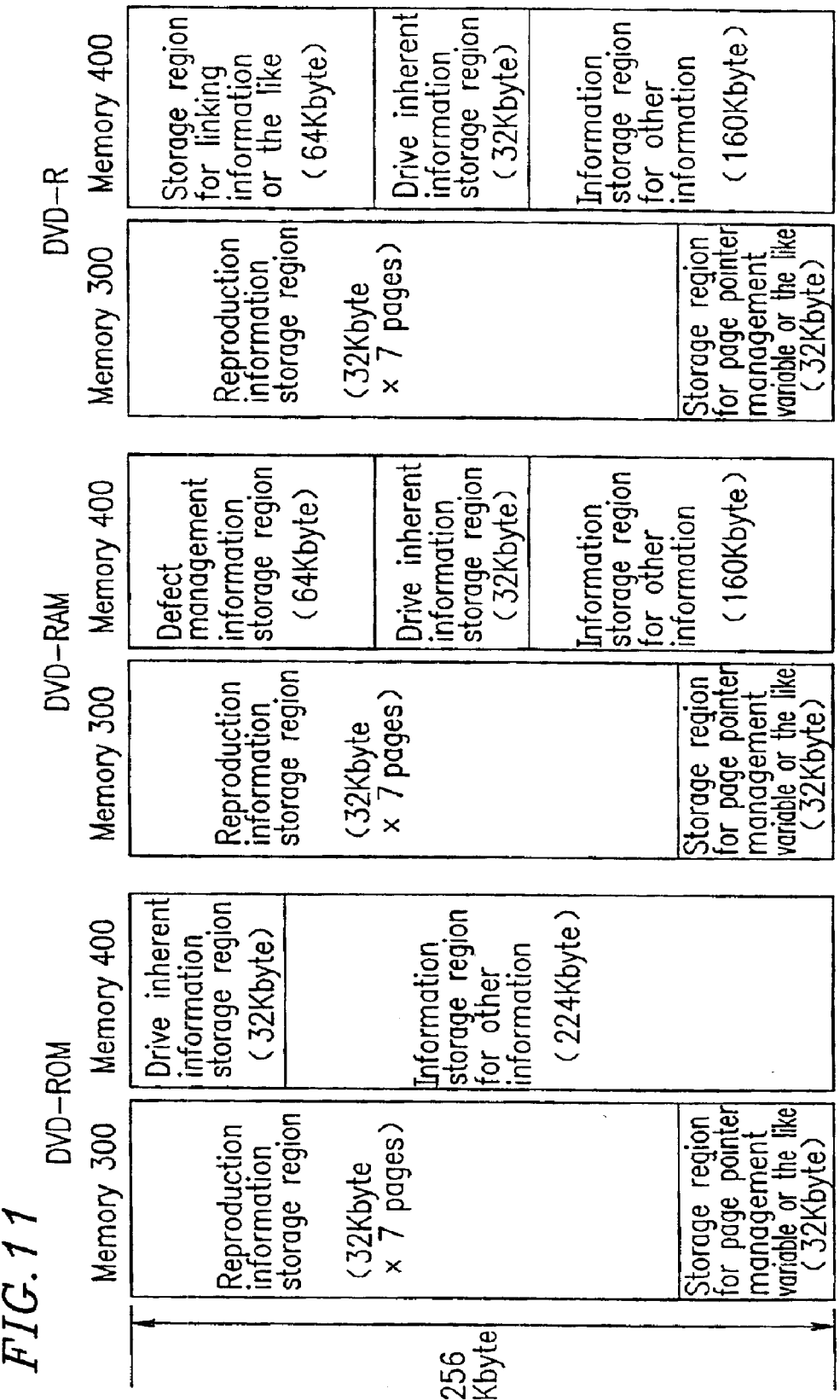
FIG. 11 shows an example of arrangement information (map) which indicates an arrangement of information stored in a first memory (memory 300) and a second memory (memory 400) according to a determination result of an optical disc determination block or control information.

FIG. 11 shows an example of arrangement information (map) which indicates an arrangement of information stored in the memories 300 and 400 according to the determination result of the optical disc determination block 7 or the control information. For clarity of illustration, in embodiment 5, the capacity of each of the memories 300 and 400 is 256 Kbytes in total. In this example, the accessing speed of the memory 300 is higher than that of the memory 400.

For example, when the determination result indicates that the optical disc 2 is a DVD-RAM, a 224 Kbyte memory region is secured for a buffer memory (reproduction information storage region) which requires a high-speed access and which is used for high-speed reproduction of sequentially-read information, and a 32 Kbyte memory region is secured for a storage region (page pointer management variable storage region) that stores a page pointer management variable of that buffer memory, address information of the outermost track of the optical disc 2, etc. These storage regions are provided in the memory 300 having the higher accessing speed. Further, a 64 Kbyte memory region is secured for a storage region (defect management information storage region) for storing defect management information which is used in a situation where seek processing necessarily occurs and it is difficult to achieve high-speed reproduction, for example, in a random-access reading operation. A 32 Kbyte memory region is secured for a storage region (drive inherent information storage region) for storing information inherent to a drive which is used for an INQUIRY command or the like. (The INQUIRY command is used for requesting the drive inherent information from a host PC to the drive.) These storage regions are provided in the memory 400 because information stored in these regions does not require a high speed access in comparison to that stored in the storage regions provided in the memory 300. Furthermore, in the memory 400, a 160 Kbyte memory region is secured for a storage region that stores other information.

For example, when the determination result indicates that the optical disc 2 is a DVD-R, a 224 Kbyte memory region is secured for a buffer memory (reproduction information storage region) which requires a high-speed access and which is used for high-speed reproduction of sequentially-read information, and a 32 Kbyte memory region is secured for a storage region (page pointer management variable storage region) that stores a page pointer management variable of that buffer memory, address information of the outermost track of the optical disc 2, etc. These storage regions are provided in the memory 300 having the higher accessing speed. Further, a 64 Kbyte memory region is secured for a storage region (linking information storage region) that stores linking information or border information which is used in a situation where seek processing necessarily occurs and it is difficult to achieve high-speed reproduction, for example, in a random-access reading operation. A 32 Kbyte memory region is secured for a storage region (drive inherent information storage region) for storing information inherent to a drive which is used for an INQUIRY command or the like. (The INQUIRY command is used for requesting the drive inherent information from a host PC to the drive.) These storage regions are provided in the memory 400 because information stored in these regions does not require a high speed access in comparison to that stored in the storage regions provided in the memory 300. Furthermore, in the memory 400, a 160 Kbyte memory region is secured for a storage region that stores other information.

For example, when the determination result indicates that the optical disc 2 is a DVD-ROM, a 224 Kbyte memory region is secured for a buffer memory (reproduction information storage region) which requires a high-speed access and which is used for high-speed reproduction of sequentially-read information, and a 32 Kbyte memory region is secured for a storage region (page pointer management variable storage region) that stores a page pointer management variable of that buffer memory, address information of the outermost track of the optical disc 2, etc. These storage regions are provided in the memory 300 having the higher accessing speed. Further, a 32 Kbyte memory region is secured for a storage region (drive inherent information storage region) for storing information inherent to a drive which is used for an INQUIRY command or the like. (The INQUIRY command is used for requesting the drive inherent information from a host PC to the drive.) These storage regions are provided in the memory 400 because information stored in these regions does not require a high speed access in comparison to that stored in the storage regions provided in the memory 300. Furthermore, in the memory 400, a 224 Kbyte memory region is secured for a storage region that stores other information.

As described above, according to embodiment 5, an expensive high-speed memory and a less-expensive, low- or middle-speed memory are used in combination, whereby an efficient memory arrangement can be achieved. Thus, a highly-functional optical disc controller having a small number of terminals can be realized at a low cost.

As described above, by employing the above features of embodiment 5 of the present invention, an optimum memory arrangement can be automatically achieved according to the class and type of an optical disc, or control information thereof. Accordingly, a limited capacity of memory can be efficiently utilized according to the class and type of an optical disc, or control information thereof.

(Embodiment 6)

Figure 12:
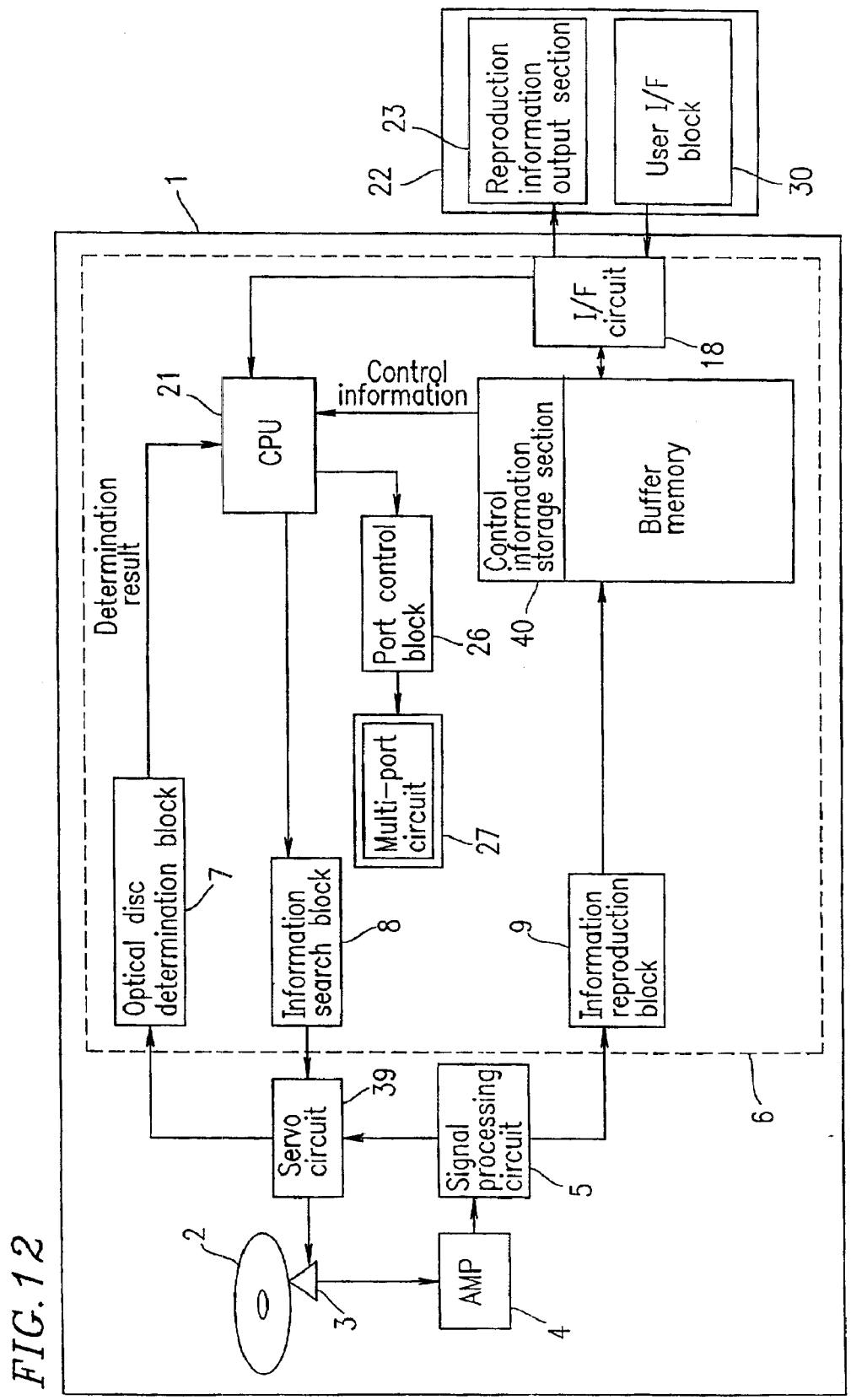
FIG. 12 shows a structure of an optical disc apparatus including an optical disc controller according to embodiment 6 of the present invention.

FIG. 12 shows a structure of an optical disc apparatus 1 including an optical disc controller 6 according to embodiment 6 of the present invention. The optical disc controller 6 controls recording or reproduction of data on an optical disc. In FIG. 12, like elements are indicated by like reference numerals used in embodiment 1 of FIG. 1, and detailed descriptions thereof are omitted. In embodiment 6, a "port" refers to a general-purpose terminal which functions as an input or output terminal. A buffer memory 40 of embodiment 6 shown in FIG. 12 has a function equivalent to that of the variable memory 25 of embodiment 1. However, the buffer memory 40 does not necessarily need to be variable.

A port control method used for a multi-port circuit, which is an essential part of embodiment 6, is described below.

In embodiment 6, the optical disc controller 6 further includes a multi-port circuit (general-purpose terminal) 27 as an input or output terminal, and a port control block (general-purpose terminal control means) 26 for controlling the multi-port circuit 27. The multi-port circuit 27 is connectable to a plurality of circuits. The CPU (memory control means) 21 controls the port control block 26 such that the multi-port circuit 27 is connected to a predetermined one of the plurality of circuits according to the determination result of the optical disc determination block 7.

The servo circuit 39 measures the amplitudes of a tracking error signal (TE), a focus error signal (FE), a light quantity signal (AS), and an RF signal (RF), which have been generated and processed by the signal processing circuit 5. The servo circuit 39 outputs the measured signals, or a combination signal (a comparison signal, a sum signal, a difference signal, multiplication signal, a division signal, or the like) produced from some of the measured signals, to the optical disc determination block 7 in the optical disc controller 6 as disc determination data.

The optical disc determination block 7 compares the determination data input from the servo circuit 39 with a preset level so as to determine the class and type of the optical disc 2 mounted on the optical disc apparatus 1. Herein, the "class" of an optical disc refers to a category of an optical disc, which is defined by the type of physical structure, such as DVD-ROM, DVD-R, DVD-RW, DVD-RAM, or the like.

The determination result of the optical disc determination block 7 is sent to the CPU 21. Based on the determination result of the optical disc determination block 7, the CPU 21 determines a port setting optimum for the optical disc 2 mounted on the optical disc apparatus 1 (i.e., information for setting a signal to be transmitted to a general-purpose terminal according to the determination result of the optical disc determination block 7). The determined port setting is output as an instruction signal to a port control block 26, and a multi-port circuit 27 is optimally set based on the instruction signal. Thus, by using the optical disc controller 6 of embodiment 6 of the present invention, information read from the optical disc 2 mounted on the optical disc apparatus 1 can be stably reproduced at a high speed regardless of the class and type of the optical disc 2.

When data such as the FE signal, AS signal, or the like, are used by the signal processing circuit 5 to determine the optimum port setting, it is preferable that the determination result and input measured data be stored in a fixed position in the buffer memory 40. With such a structure, even when the optical disc 2 is replaced with another one, newly-obtained determination data is compared with the stored data, whereby the class and the type of the replaced disc can be determined at a high accuracy. It should be noted that embodiment 6 of the present invention is not limited to the above described disc determination method nor the structures of the optical disc apparatus 1 and host controller 22.

Next, port setting of the multi-port circuit 27 in the optical disc apparatus 1 using the optical disc controller 6 according to embodiment 6 is described in more detail. Herein, consider an example where the classes of the optical discs 2 to be reproduced are DVD-ROM and DVD-RAM.

Figure 13A:
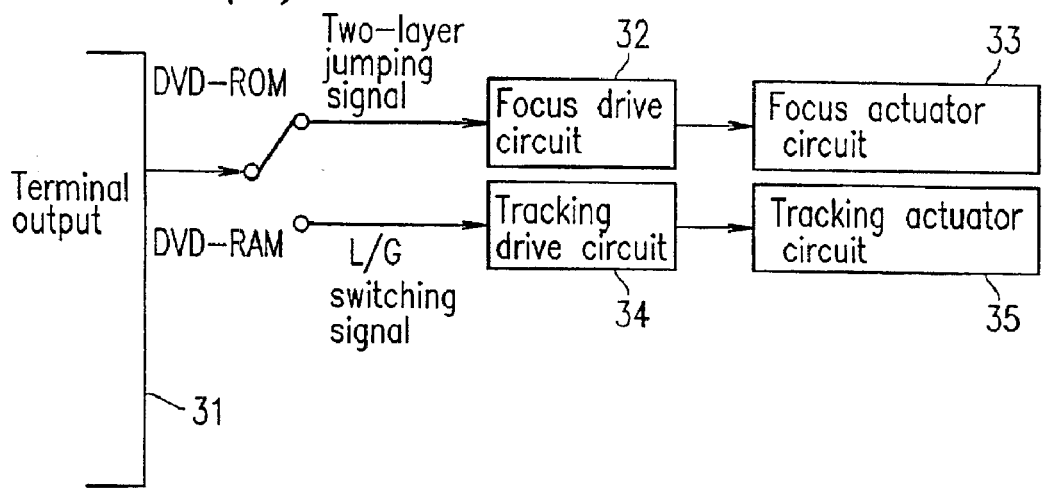
FIG. 13 shows an example of port setting of a multi-port circuit which is set according to a determination result of an optical disc determination block.
Figure 13B:
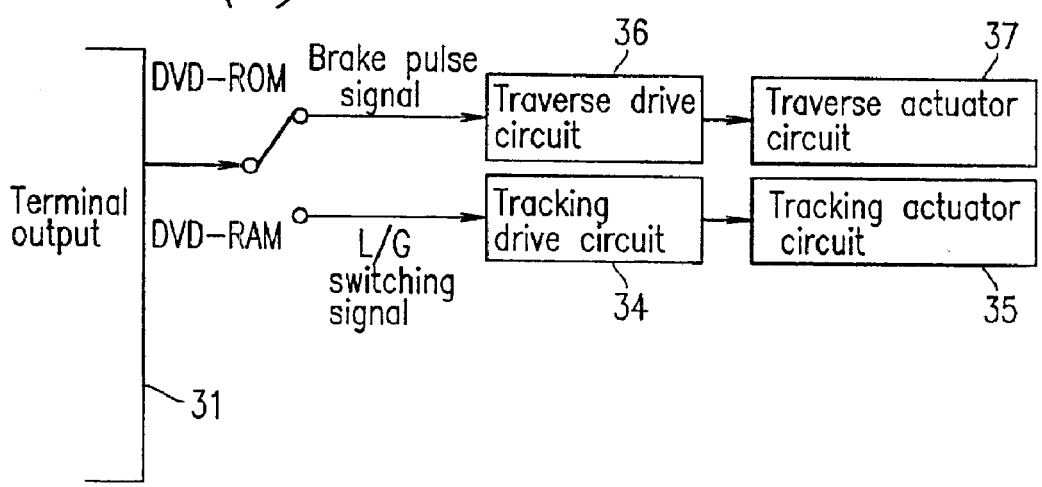

FIG. 13 shows an example of port setting of the multi-port circuit 27 which is set according to the determination result of the optical disc determination block 7.

In the DVD-ROM standards, there is a disc having two recording layers on one disc surface. This DVD-ROM disc is formed by combining two layers each having a thickness of 0.6 millimeter. In this disc, information is recorded in the both layers (i.e., both recording layers), and signals can be read from the respective recording layers by emitting a light beam from the same side of the disc while a focus position is moved. In order to read information from such an optical disc, it is necessary to perform two-layer jump processing so as to move the focusing position to a desired layer. On the other hand, in the DVD-RAM standards, there is no disc which has two recording layers on one disc surface, and therefore, the two-layer jump processing is not required. However, since the DVD-RAM standards employs a recording method where data is recorded in both lands and grooves, which are track grooves formed on a signal recording surface, it is necessary to perform land/groove (L/G) switching processing of switching the polarity of a tracking servo signal between a land portion and a groove portion, in order to control a light beam such that the light beam accurately follows a desired track.

For example, when the determination result of the optical disc determination block 7 indicates that the optical disc 2 mounted on the optical disc apparatus 1 is a DVD-ROM having two recording layers on each surface, the CPU 21 issues a two-layer jumping signal for moving the focus position to a desired layer, so as to drive a focus actuator in a controlled manner by using a focus actuator circuit 33 via a focus drive circuit 32 as shown in FIG. 13(*a*). Alternatively, when the determination result of the optical disc determination block 7 indicates that the optical disc 2 mounted on the optical disc apparatus 1 is a DVD-RAM, the CPU 21 issues an L/G switching signal so as to drive a tracking actuator in a controlled manner by using a tracking actuator circuit 35 via a tracking drive circuit 34. Thus, in the case of a DVD-RAM, two types of signals are selectively output from a single terminal.

Furthermore, in a DVD-ROM disc, data is recorded over the entire surface of the disc up to a maximum recording limit position, and accordingly, a traveling direction of the optical pickup 3 can be detected based on a phase difference between a tracking error signal and an off-track signal, which are generated from a detection signal of the optical pickup 3 moving in a radial direction of the disc. Thus, a brake pulse signal is effectively used for stopping the optical pickup 3 at a desired position. On the other hand, in a DVD-RAM disc, there are some unrecorded regions over the disc. Thus, detection accuracy of the traveling direction of the optical pickup 3 is incorrect, and accordingly, a brake pulse signal produces no effect or some adverse effect in stopping the optical pickup 3 at a desired position. Therefore, in order to allow the light beam to follow lands and grooves, which are formed by cutting a single spiral of track groove over a signal recording surface of the disc, an L/G switching pulse signal is indispensable for appropriately switching the polarity of a servo signal.

Thus, for example, when the determination result of the optical disc determination block 7 indicates that the optical disc 2 mounted on the optical disc apparatus 1 is a DVD-ROM, the CPU 21 issues a brake pulse signal so as to drive a traverse actuator in a controlled manner by using a traverse actuator circuit 37 via a traverse drive circuit 36 as shown in FIG. 13(*b*). Alternatively, when the determination result of the optical disc determination block 7 indicates that the optical disc 2 mounted on the optical disc apparatus 1 is a DVD-RAM, the CPU 21 issues an L/G switching signal so as to drive a tracking actuator in a controlled manner by using a tracking actuator circuit 35 via a tracking drive circuit 34. Thus, in the case of a DVD-RAM, two types of signals are selectively output from a single terminal.

In the structure described in embodiment 6, functions of an output port or signals output from the output port are switched. However, according to the present invention, the above structure may be modified such that, when the optical disc 2 is a disc of a first type, that port functions as an input port; and when the optical disc 2 is a disc of a second type, that port functions as an output port.

Furthermore, in the structure described in embodiment 6, a general-purpose terminal is switched according to the determination result of the optical disc determination block 7, but the present invention is not limited to such a structure. A structure where the general-purpose terminal is switched according to control information of the information reproduction block 9 is within the scope of the present invention.

With such a structure of embodiment 6, even when the optical disc 2 has a partial ROM structure where the innermost track of the optical disc 2 includes a ROM region exclusively used for reproduction and the outermost track includes a recordable RAM region, or where the first layer of the disc includes a recordable RAM region and the second layer includes a ROM region, information about a control track and boundary addresses of each of the regions can be obtained at a high speed. Thus, switching among the respective storage regions can be smoothly achieved without interrupting a reproduction operation, and accordingly, accessibility to the optical disc 2 can be improved.

As described above, by employing the above features of embodiment 6 of the present invention, switching of a general-purpose terminal can be automatically achieved according to the type of an optical disc, and a necessary signal can be transmitted efficiently according to the type of the optical disc.

(Embodiment 7)

Figure 14:
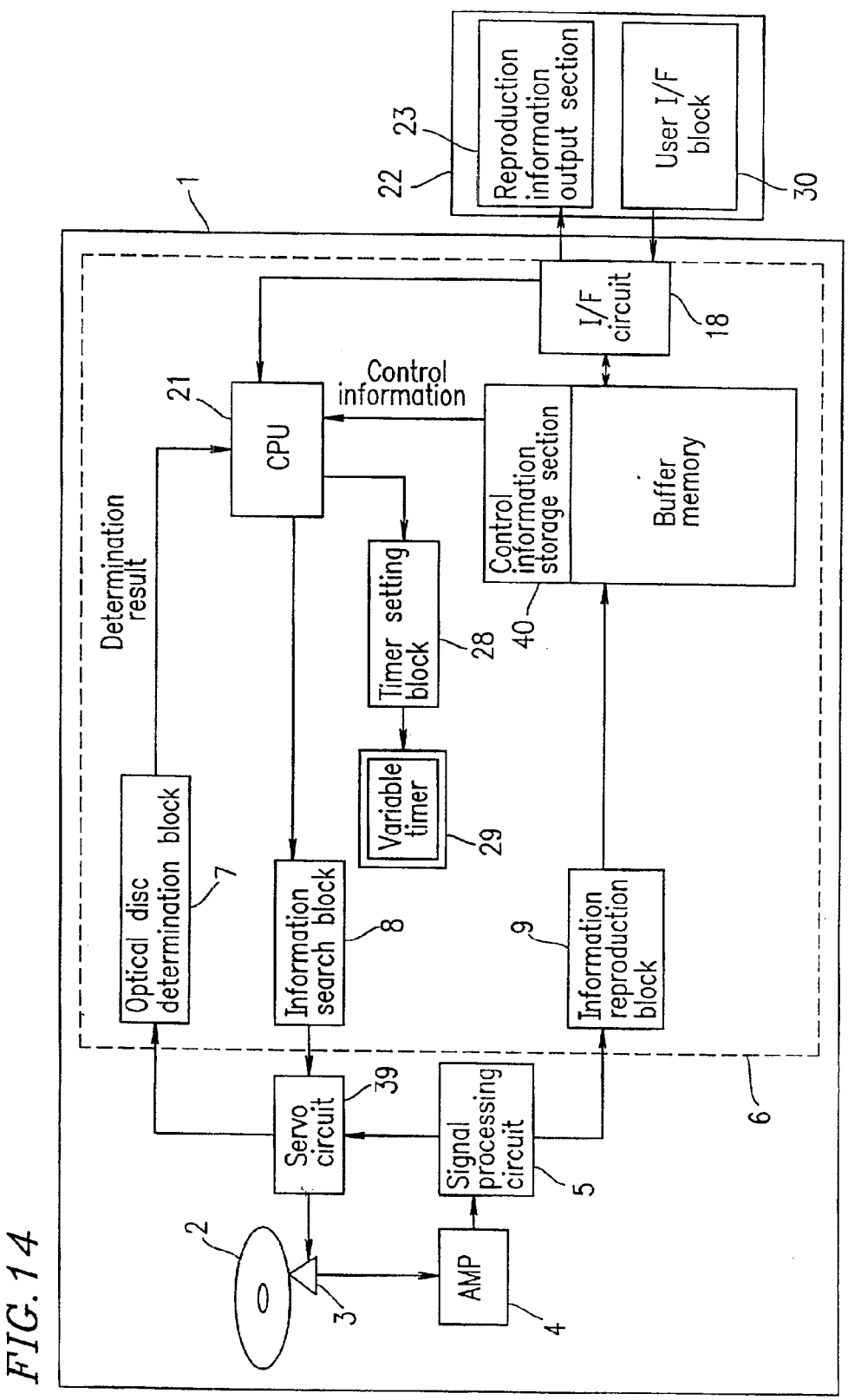
FIG. 14 shows a structure of an optical disc apparatus including an optical disc controller according to embodiment 7 of the present invention.

FIG. 14 shows a structure of an optical disc apparatus 1 including an optical disc controller 6 according to embodiment 7 of the present invention. The optical disc controller 6 controls recording or reproduction of data on an optical disc. In FIG. 14, the structures of the optical disc apparatus 1 and host controller 22 are the same as those of embodiment 6 (FIG. 12) except for a timer setting block 28 and a variable timer 29. Detailed descriptions of the same components are herein omitted.

A timer setting method of the variable timer 29, which is a primary part of embodiment 7 of the present invention, is described below.

In embodiment 7, the optical disc controller 6 further includes the variable timer (timer) 29 and the timer setting block (timer control means) 28 for controlling the variable timer 29. The CPU (memory control means) 21 controls the timer setting block 28 such that in the timer 29, a time interval between timer counts, an interruption preset value, or a reset condition, is changed according to the determination result of the optical disc determination block 7.

The servo circuit 39 measures the amplitudes of a tracking error signal (TE), a focus error signal (FE), a light quantity signal (AS), and an RF signal (RF), which have been generated and processed by the signal processing circuit 5. The servo circuit 39 outputs the measured signals, or a combination signal (a comparison signal, a sum signal, a difference signal, multiplication signal, a division signal, or the like) produced from some of the measured signals, to the optical disc determination block 7 in the optical disc controller 6 as disc determination data.

The optical disc determination block 7 compares the determination data input from the servo circuit 39 with a preset level so as to determine the class of the optical disc 2 mounted on the optical disc apparatus 1. Herein, the "class" of an optical disc refers to a category of an optical disc, which is defined by the type of physical structure, such as DVD-ROM, DVD-R, DVD-RW, DVD-RAM, or the like.

The determination result of the optical disc determination block 7 is sent to the CPU 21. Based on the determination result of the optical disc determination block 7, the CPU 21 determines a timer setting optimum for the optical disc 2 mounted on the optical disc apparatus 1. The determined timer setting is output as an instruction signal to the timer setting block 28, and the timer 29 is optimally set based on the instruction signal. Thus, by using the optical disc controller 6 of embodiment 7 of the present invention, information read from the optical disc 2 mounted on the optical disc apparatus 1 can be stably reproduced at a high speed regardless of the class and type of the optical disc 2.

When data such as the FE signal, AS signal, or the like, are used by the signal processing circuit 5 to determine the optimum timer setting, it is preferable that the determination result and input measured data be stored in a fixed position in the buffer memory 40. With such a structure, even when the optical disc 2 is replaced with another one, newly-obtained determination data is compared with the stored data, whereby the class and the type of the replaced disc can be determined at a high accuracy. It should be noted that embodiment 7 of the present invention is not limited to the above described disc determination method nor the structures of the optical disc apparatus 1 and host controller 22.

Next, timer setting of the variable timer 29 in the optical disc apparatus 1 using the optical disc controller 6 according to embodiment 7 is described in more detail. Herein, consider an example where the optical discs 2 to be reproduced are DVD-ROM and DVD-RAM.

Figure 15:
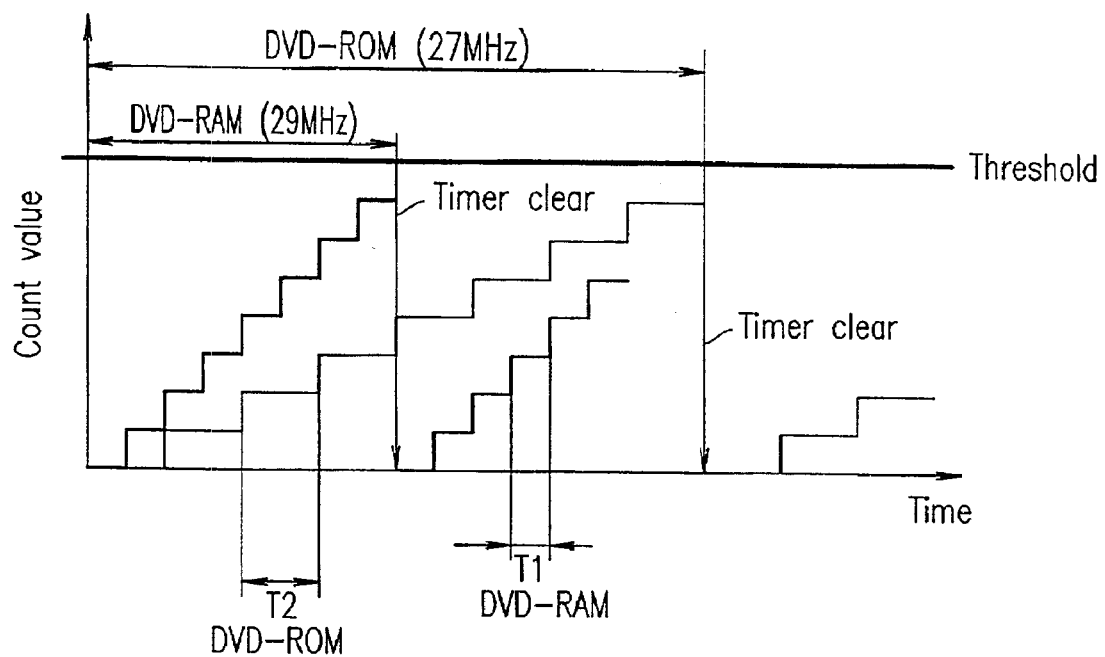
FIG. 15 is a graph of a count value over time for a variable timer which is set according to a determination result of an optical disc determination block.

FIG. 15 is a graph of a count value over time for the variable timer 29 which is set according to the determination result of the optical disc determination block 7.

In FIG. 15, the vertical axis represents a count value of the timer 29; the horizontal axis represents a time; and T1 and T2 represent values (times) set in the timer 29. The initial value of the timer 29 is zero. The count value of the timer 29 is incremented after every time period T1 or T2 elapses. When the count value reaches a certain threshold, the count value is cleared. Then, increment of the count value is restarted from the initial value zero, and the count value is incremented after every time period T1 or T2 elapses.

For example, consider an example of linear velocity measurement which is performed in controlling the rotation speed of a disc, such that the number of rotations (rotation rate) of the disc is in synchronization with the speed of reading recorded data which is specified in the DVD standards.

When the determination result of the optical disc determination block 7 indicates that the optical disc 2 mounted on the optical disc apparatus 1 is a DVD-RAM, the frequency of a signal (PLL clock) which is in synchronization with data recorded in a recording region corresponding to a single rotation of the disc is about 29 MHz, and the set value of the timer 29 is set to T1. When the determination result of the optical disc determination block 7 indicates that the optical disc 2 mounted on the optical disc apparatus 1 is a DVD-ROM, the frequency of a signal (PLL clock) which is in synchronization with data recorded in a recording region corresponding to a single rotation of the disc is about 27 MHz, and the set value of the timer 29 is set to T2. According to embodiment 7, even if the synchronization clock is varied by changing discs, the access time does not increase because correct calculation of the linear velocity and determination of standby of a disc rotation operation are possible.

As described above, by employing the above features of embodiment 7 of the present invention, set conditions of a timer can be automatically switched according to the type of an optical disc, and a reproduction operation performed according to the type of the optical disc (compatible reproduction) can be realized. Further, the reproduction performance of an optical disc apparatus is improved.

Furthermore, in the structure described in embodiment 7, the timer setting of the variable timer 29 is performed according to the determination result of the optical disc determination block 7, but the present invention is not limited to such a structure. A structure where the timer setting of the variable timer 29 is performed according to control information of the information reproduction block 9 is within the scope of the present invention.

With such a structure of embodiment 7, even when the optical disc 2 has a partial ROM structure where the innermost track of the optical disc 2 includes a ROM region exclusively used for reproduction and the outermost track includes a recordable RAM region, or where the first layer of the disc includes a recordable RAM region and the second layer includes a ROM region, information about a control track and boundary addresses of each of the regions can be obtained at a high speed. Thus, switching among the respective storage regions can be smoothly achieved without interrupting a reproduction operation, and accordingly, accessibility to the optical disc 2 can be improved.

(Embodiment 8)

Figure 16:
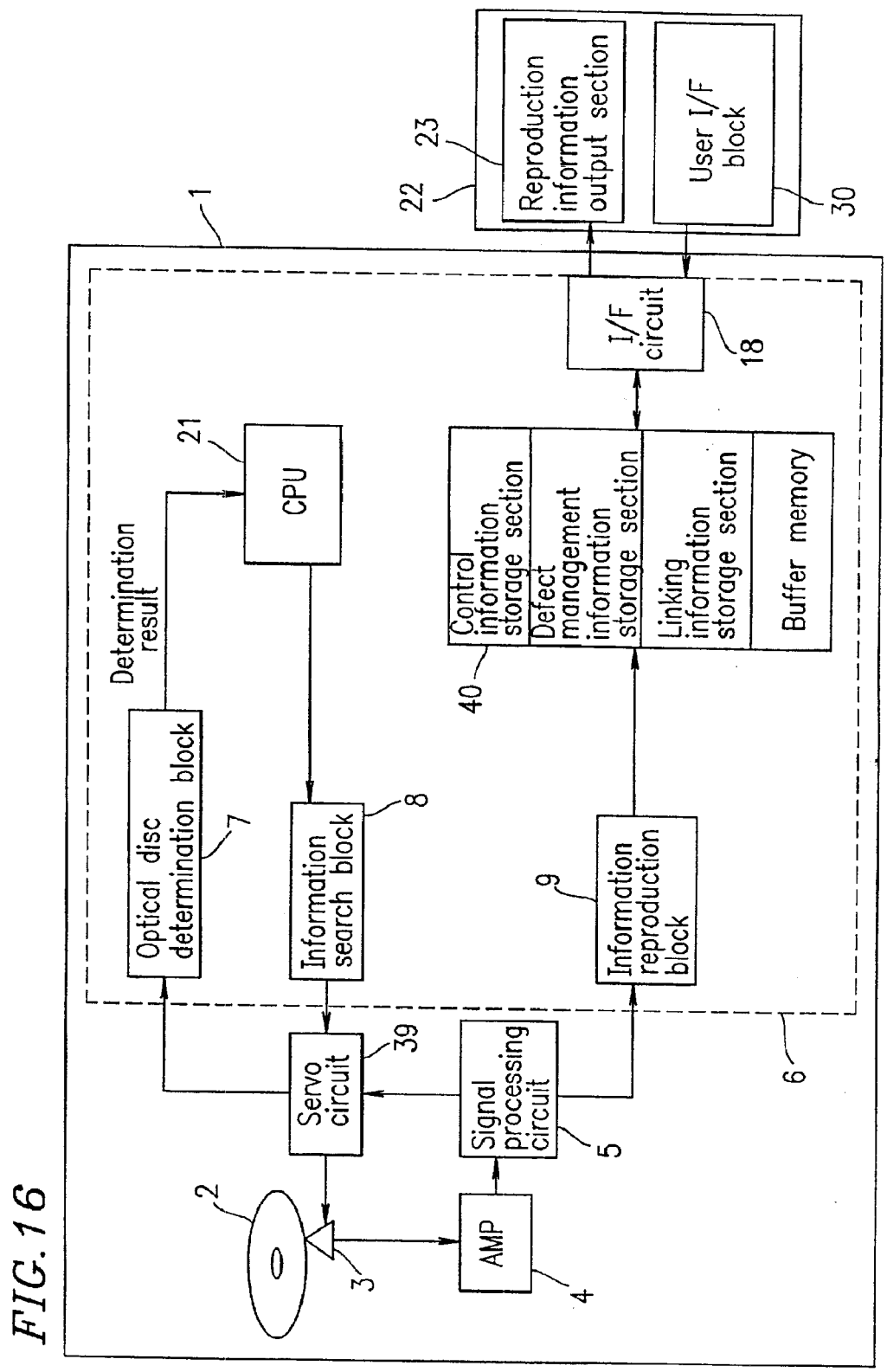
FIG. 16 shows a structure of an optical disc apparatus including an optical disc controller according to embodiment 8 of the present invention.

FIG. 16 shows a structure of an optical disc apparatus 1 including an optical disc controller 6 according to embodiment 8 of the present invention. The optical disc controller 6 controls recording or reproduction of data on an optical disc. In FIG. 16, the structure of the optical disc apparatus 1 is equivalent to that of embodiment 7 (FIG. 14) from which the timer setting block 28 and the variable timer 29 are removed. Detailed descriptions of the same components are herein omitted.

In embodiment 8, the information reproduction block (reproduction means) 9 is structured so as to output control information reproduced by the information reproduction block 9 to the memory 40 according to the determination result of the optical disc determination block 7.

Figure 17:
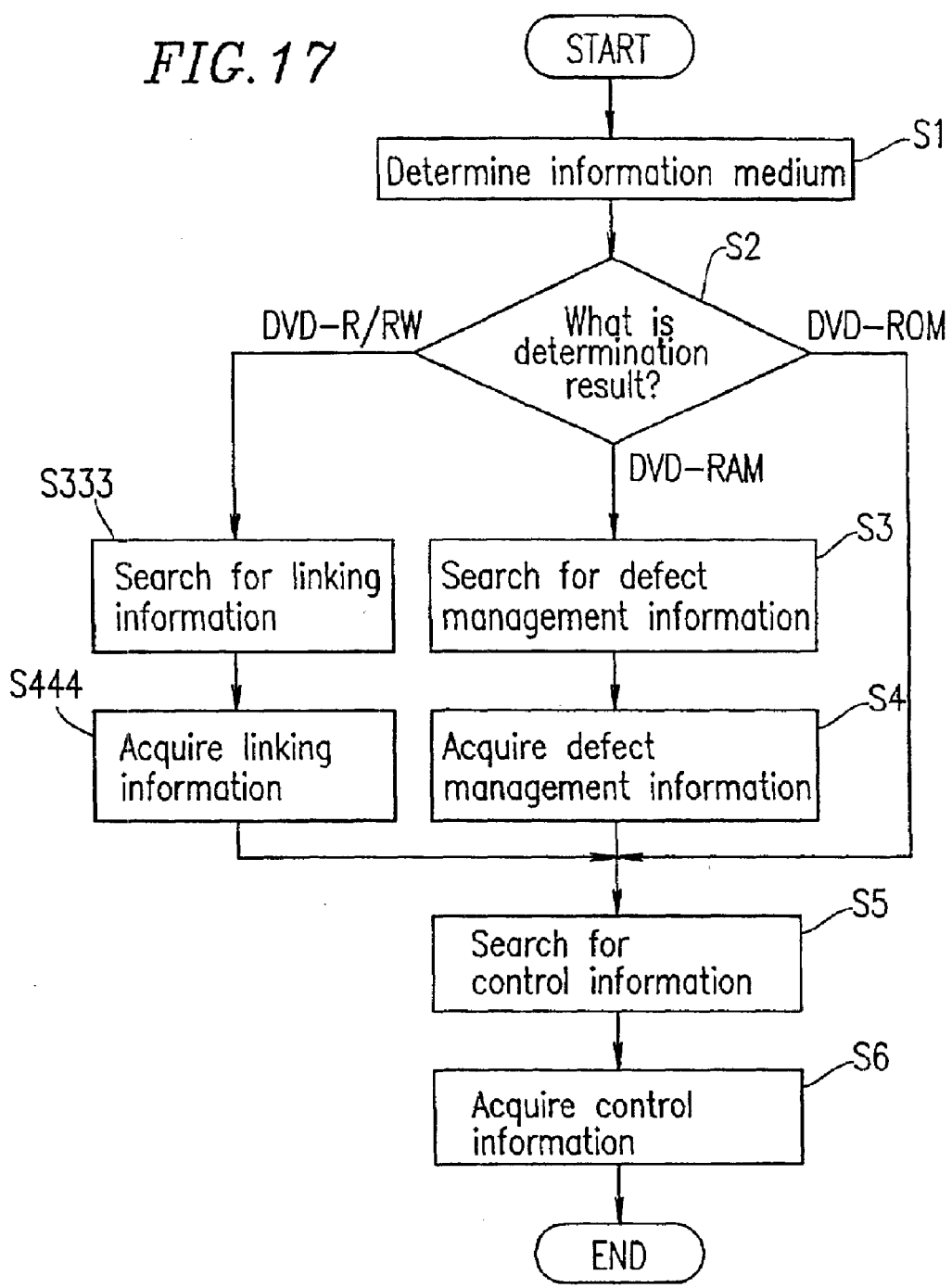
FIG. 17 is a flowchart illustrating operation of an optical disc apparatus and host controller according to embodiment 8.

In embodiment 8, the optical disc apparatus 1 and host controller 22 operate according to a procedure illustrated in a flowchart of FIG. 17.

At the first step, the servo circuit 39 measures the amplitudes of a tracking error signal (TE), a focus error signal (FE), a light quantity signal (AS), and an RF signal (RF), which have been generated and processed by the signal processing circuit 5. The servo circuit 39 outputs the measured signals, or a combination signal (a comparison signal, a sum signal, a difference signal, multiplication signal, a division signal, or the like) produced from some of the measured signals, to the optical disc determination block 7 in the optical disc controller 6 as disc determination data (Step S1).

The optical disc determination block 7 compares the determination data input from the servo circuit 39 with a preset level so as to determine the class of the optical disc 2 mounted on the optical disc apparatus 1. Herein, the "class" of an optical disc refers to a category of an optical disc, which is defined by the type of physical structure, such as DVD-ROM, DVD-R, DVD-RW, DVD-RAM, or the like.

The determination result of the optical disc determination block 7 is sent to the CPU 21.

Next, the CPU 21 determines the type of the optical disc 2 (Step S2). If the CPU 21 determines that the optical disc 2 is a DVD-RAM, the CPU 21 issues to the information search block 8 a search instruction for searching a predetermined region of the optical disc 2 in which defect management information is stored (Step S3). Further, the information search block 8 sends to the servo circuit 39 a start command and movement data (the number of tracks to be traversed), which instruct that the optical pickup 3 is to be moved to a region in which the defect management information is stored. The servo circuit 39 executes necessary processing according to the start command and the movement data from the CPU 21. Furthermore, the servo circuit 39 produces a traversal drive signal for moving the optical pickup 3 in a radial direction of the optical disc 2 so as to seek a desired region of the optical disc 2.

After the search operation is ended, defect management information is input to the buffer memory 40 via the optical pickup 3, the AMP 4, the signal processing circuit 5, and the information reproduction block 9 (Step S4). The information input to the buffer memory 40 is stored in a defect management information storage section which is provided at a predetermined position on the buffer memory 40.

Next, control information other than the defect management information, which is inherent to the optical disc 2 and stored in a certain region of the optical disc 2, is searched in the same manner as that for the defect management information (Step S5). Then, desired control information is stored in a control information storage section which is provided at a predetermined position on the buffer memory 40 (Step S6).

If the CPU 21 determines at Step S2 that the optical disc 2 is a DVD-ROM, the process proceeds to Step S5 because the DVD-ROM does not contain the defect management information. At Step S5, control information, which is inherent to the optical disc 2 and stored in a certain region of the optical disc 2, is searched as described above. Then, at Step S6, desired control information is stored in the control information storage section which is provided at a predetermined position on the buffer memory 40. In this case, accessing to the optical disc 2 is performed along physically and spatially continuing addresses and data.

If the CPU 21 determines at Step S2 that the optical disc 2 is a DVD-R/RW, linking information is acquired in place of the defect management information at Steps S333 and S444 in the same manner as that described above. Then, at Step S5, control information other than the linking information is acquired.

As described above, in embodiment 8, necessary control information can be acquired according to the class of the optical disc without depending on an input signal from the host controller 22.

(Embodiment 9)

Next, a structure of embodiment 9 for implementing an information connecting process, an information complementing process, and an information extracting process is described. Herein, the "information connecting process" refers to a process for connecting scattered pieces of information which are stored in discontinuous positions on the disc, such as substituent information for defect information in a DVD-RAM, information discontinued due to linking in a DVD-R/RW, or the like. The "information complementing process" refers to a process for complementing information which corresponds to a region of an optical disc in which no information is recorded, such as information in an unrecorded region in a DVD-RAM, or error-uncorrectable information recorded by an AV recording operation, with certain dummy information. The "information extracting process" refers to a process for extracting information of sound, data, images, or the like, when necessary.

Figure 18:
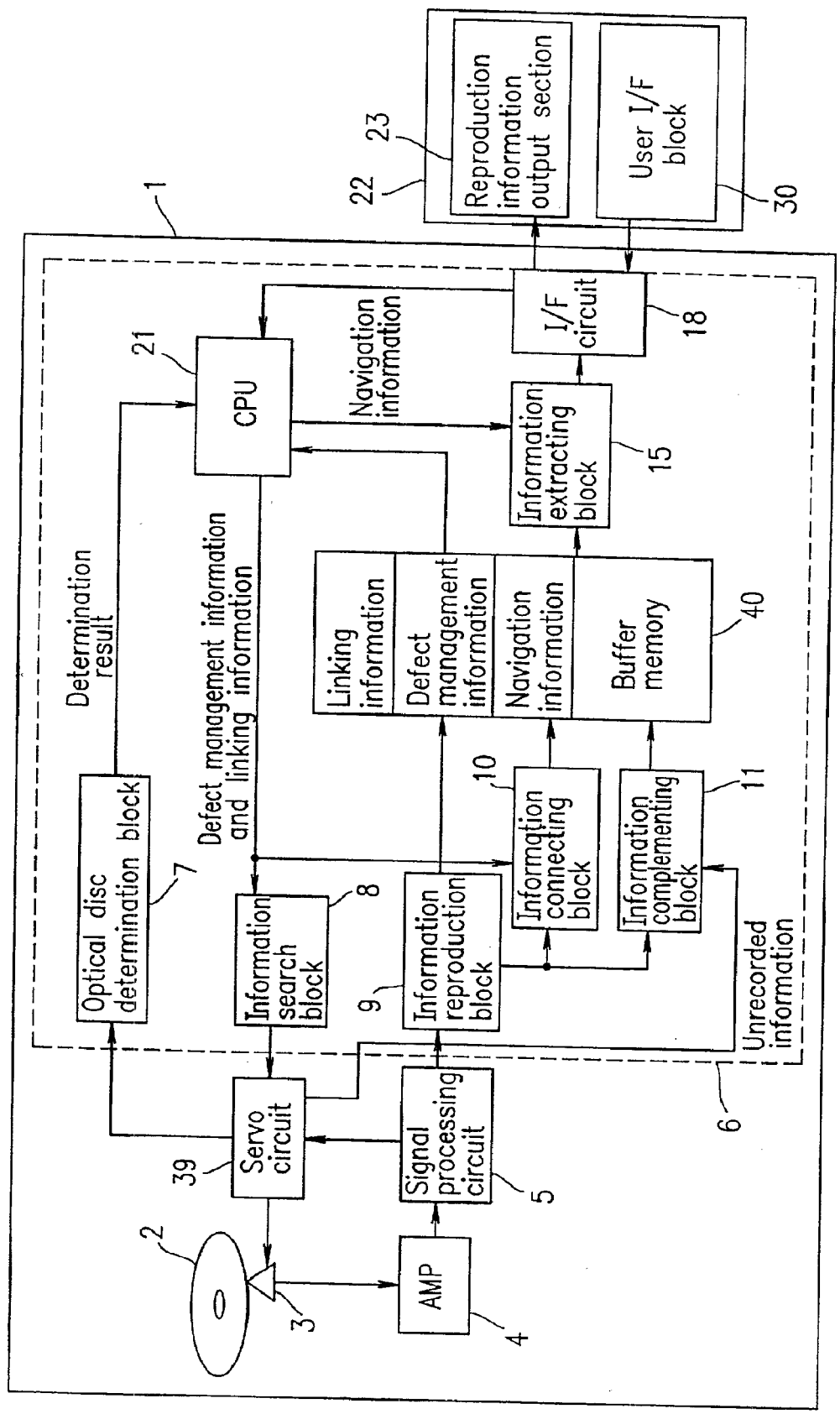
FIG. 18 shows a structure of an optical disc apparatus including an optical disc controller according to embodiment 9 of the present invention.

FIG. 18 shows a structure of an optical disc apparatus 1 including an optical disc controller 6 according to embodiment 9 of the present invention. The optical disc controller 6 controls recording or reproduction of data on an optical disc.

In embodiment 9, the optical disc controller 6 further includes an information connecting block (information connecting means) 10 for complementing a defective part, or connecting discontinuous parts, of user data stored in a memory. Control information includes defective management information used for repairing a defective part of user data or linking information for repairing discontinuous parts of user data. The CPU (memory control means) 21 controls the information connecting block 10 using the defect management information or the linking information such that the discontinuous parts of the user data are bridged.

Furthermore, the optical disc controller 6 may further include an information complementing block (information complementing means) 11 for complementing an unrecorded portion of user data. The information complementing block 11 complements an unrecorded portion of user data with a certain dummy information.

Furthermore, the optical disc controller 6 may further include an information extracting block (information extracting means) 15 for extracting information from a memory. The information extracting block 15 extracts information from the memory 40 according to the determination result of the optical disc determination block 7 or an instruction from the host controller 22 connected to the optical disc controller 6.

Figure 19:
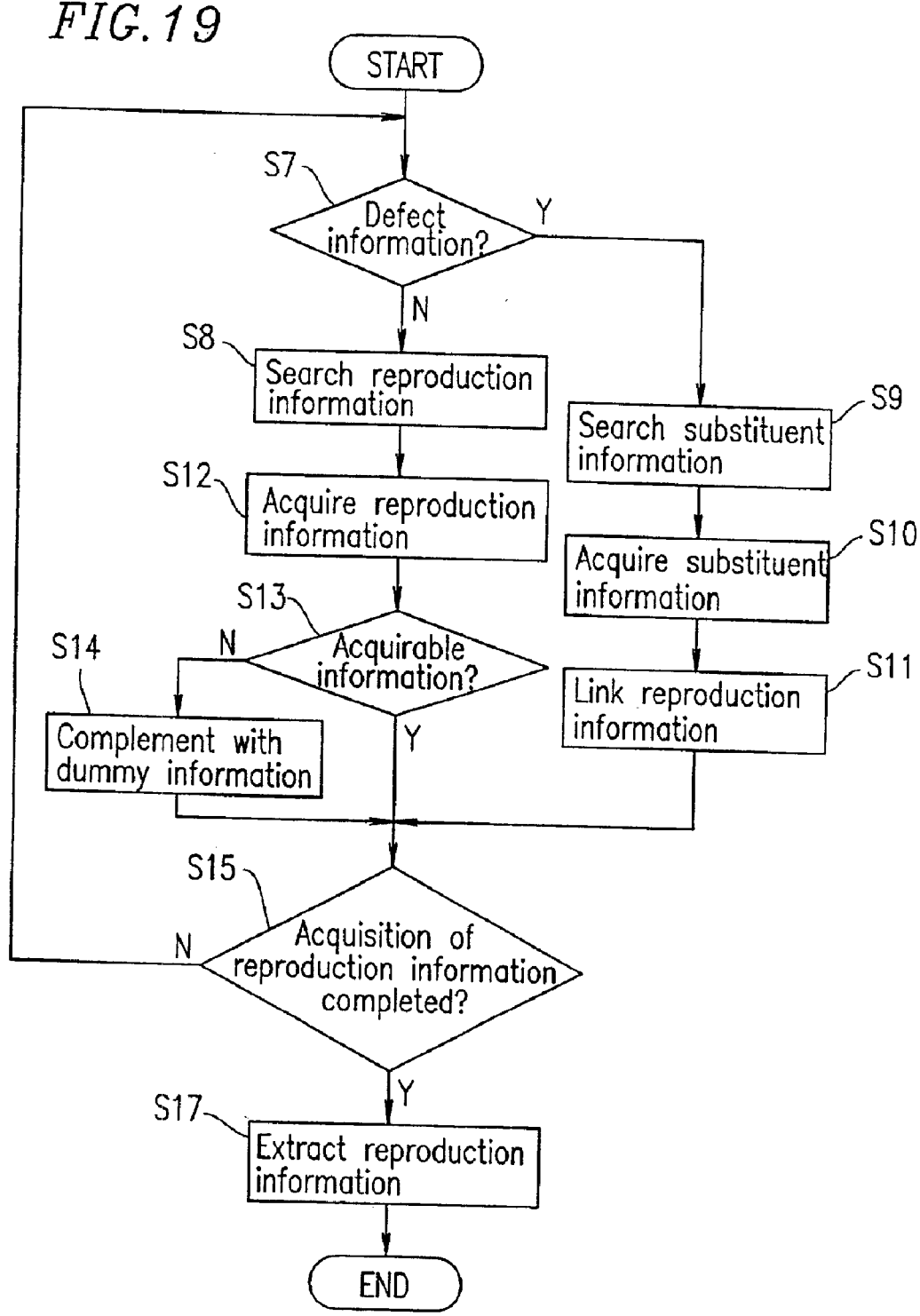
FIG. 19 is a flowchart illustrating a defect management operation of embodiment 9, which implements an information connecting process in an information connecting block, an information complementing process in an information complementing block, and an information extracting process in an information extracting block.

FIG. 19 is a flowchart illustrating a defect management operation of embodiment 9, which implements an information connecting process in the information connecting block 10, an information complementing process in the information complementing block 11, and an information extracting process in the information extracting block 15.

Figure 20:
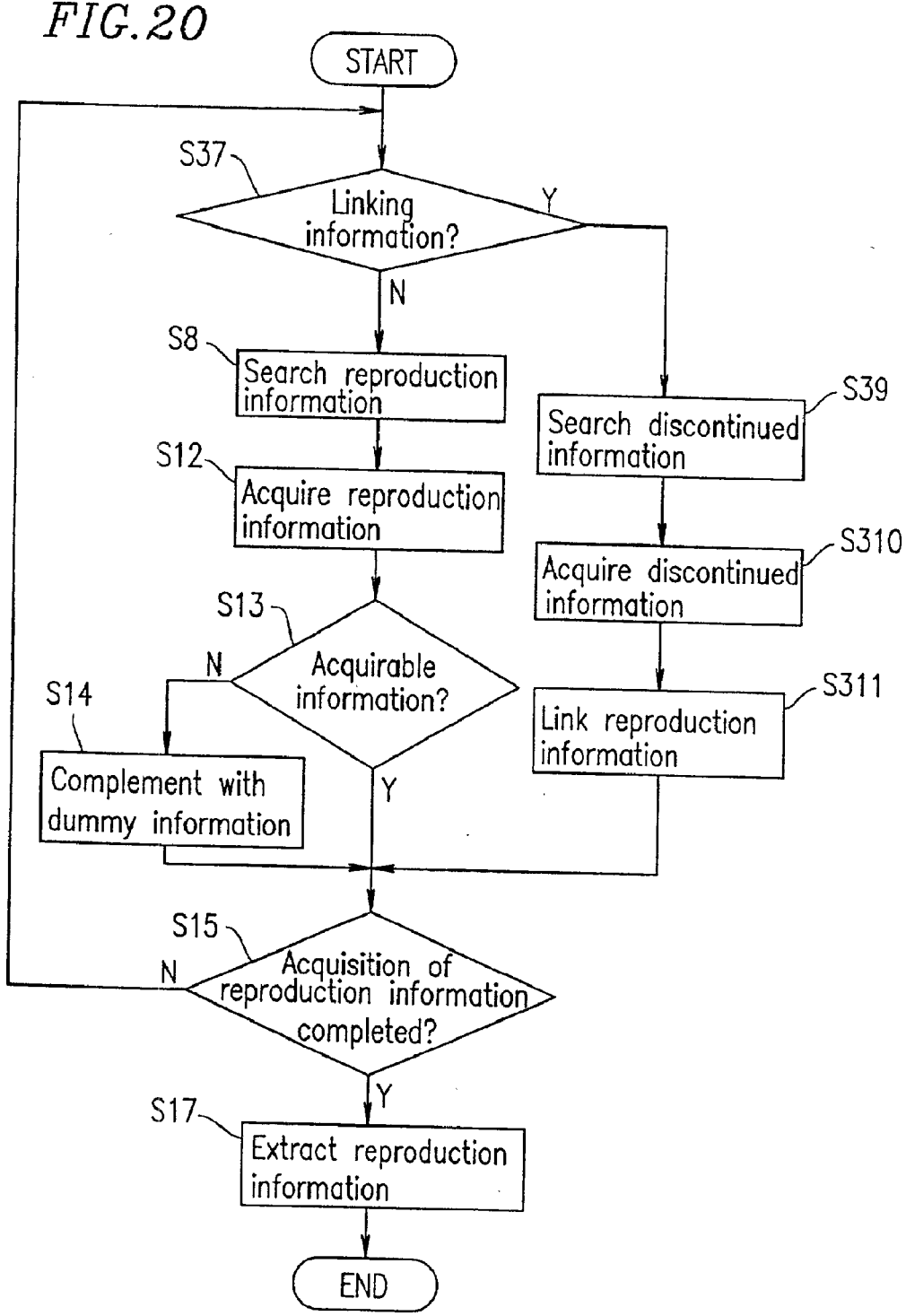
FIG. 20 is a flowchart illustrating a linking operation of embodiment 9, which implements an information connecting process in an information connecting block, an information complementing process in an information complementing block, and an information extracting process in an information extracting block.

FIG. 20 is a flowchart illustrating a linking operation of embodiment 9, which implements an information connecting process in the information connecting block 10, an information complementing process in the information complementing block 11, and an information extracting process in the information extracting block 15.

Operation of the optical disc apparatus 1 for implementing an information connecting process, an information complementing process, and an information extracting process, is described with reference to FIGS. 18, 19, and 20.

When the host controller 22 issues via a user I/F block 30 a command to read reproduction information from a certain region on the optical disc 2, the optical disc controller 6 sequentially acquires reproduction information from the head of a designated region on the optical disc 2 on a block-by-block basis, each block having a certain length. If it is determined that the optical disc 2 is a DVD-RAM, the CPU 21 determines for each block whether or not information of the block is defect information according to the defect management information stored in the buffer memory 40 (Step S7 of FIG. 19).

If the information of the block is defect information ("Y" at Step S7), the CPU 21 acquires, based on the defect management information, a position where normal reproduction information, which is substituent information for defect information, is stored. The CPU 21 issues to the information search block 8 a search instruction to search for the acquired position (Step S9). In response to the search instruction, the information search block 8 outputs to the servo circuit 39 a start command and movement data (the number of tracks to be traversed), which instruct that the optical pickup 3 is to be moved to the desired position. The servo circuit 39 executes necessary processing according to the start command and the movement data from the CPU 21. For example, the servo circuit 39 produces a traversal drive signal for moving the optical pickup 3 in a radial direction of the optical disc 2 so as to seek the desired position.

After the search operation is ended, the information search block 8 acquires substituent information from the optical disc 2 via the AMP 4 and the signal processing circuit 5 (Step S10), and outputs the substituent information to the information connecting block 10. Further, in response to an instruction issued from the CPU 21 based on the defect management information, the information connecting block 10 connects the substituent information to previously-acquired information stored in the buffer memory 40, if present (Step S11), whereby the connected information is stored in the buffer memory 40.

If it is determined that the optical disc 2 is a DVD-RAM, the CPU 21 determines for each block whether or not information of the block is a linking region according to the linking information previously stored in the buffer memory 40 (Step S37 of FIG. 20).

If the information of the block is a linking region ("Y" at Step S37), the CPU 21 acquires, based on the linking information, a position where information discontinued due to the linking region is stored. The CPU 21 issues to the information search block 8 a search instruction to search for the acquired position (Step S39). In response to the search instruction, the information search block 8 outputs to the servo circuit 39 a start command and movement data (the number of tracks to be traversed), which instruct that the optical pickup 3 is to be moved to the desired position. The servo circuit 39 executes necessary processing according to the start command and the movement data from the CPU 21. Furthermore, the servo circuit 39 produces a traversal drive signal for moving the optical pickup 3 in a radial direction of the optical disc 2 so as to seek the desired position.

After the search operation is ended, the information reproduction block 9 acquires discontinued information from the optical disc 2 via the AMP 4 and the signal processing circuit 5 (Step S310), and outputs the discontinued information to the information connecting block 10. Further, in response to an instruction issued from the CPU 21 based on the linking information, the information connecting block 10 connects the discontinued information to previously-acquired information stored in the buffer memory 40, if present (Step S311), whereby the connected information is stored in the buffer memory 40.

If the information of the block is not defect information or a linking region ("N" at Step S7 and Step S37), a position where reproduction information is stored is searched at Step S8 of FIG. 19 or 20. After the searching operation is ended, at Step S12, the information reproduction block 9 acquires the reproduction information via the AMP 4 and the signal processing circuit 5 and stores the acquired reproduction information in the buffer memory 40.

However, when the searched position is present in an unrecorded region or AV recording region in which error correction of data cannot be performed, at Step S13, the information reproduction block 9 informs the information complementing block 11 that the reproduction information cannot be acquired. At Step S14, the information complementing block 11 detects an unrecorded information or AV recording information generated by the servo circuit 39, and generates dummy information of a null code and stores it in the buffer memory 40.

As described above, even when information to be reproduced is physically disconnected due to a substituting process based on defect management or a linking process using linking information, substituent information corresponding to defect information or information discontinued due to linking is automatically searched and connected. Thus, a host controller (host computer) can access a required region of the optical disc 2 regardless of the class of the optical disc 2. Furthermore, even when a read command is issued for a region where no information is stored (an unrecorded region or a region where error correction impossibility information is stored), such a region is automatically implanted (complemented) with dummy information. With such an arrangement, occurrence of an error in the host controller can be prevented, and validity of data can be maintained.

Then, at Step S15, in response to a request from the host controller 22 for reproduction information, it is determined whether or not acquisition of the reproduction information has been completed. If acquisition of the reproduction information has not been completed, the process returns to Step S7 (or Step S37), and the above procedure is performed again.

If acquisition of the reproduction information has been completed, output control processing is performed based on navigation information at Step S17. For example, when the reproduction information is DVD-VIDEO information, extraction of the following information is automatically performed by the information extracting block 15 based on the navigation information included in reproduction information previously stored in the buffer memory 40: MPEG-Video information which is required for reproduction of the DVD-VIDEO information (e.g., information corresponding to the aspect ratio of 16:9, information corresponding to the aspect ratio of 4:3, etc.); image information such as subtitle information (e.g., Japanese-language information, English-language information, etc.); sound information (e.g., Dolby digital sound information, linear PCM information, MPEG audio information, etc.); or sub-voice information (e.g., English-language voice, Japanese-language voice, etc.).

As described above, in an optical disc apparatus 1 including an optical disc controller 6 of the present invention, information extracted in response to a request from the host controller 22 can be quickly output. Further, the host controller 22 only needs to perform a minimum amount of command issuance processing, error processing, and mechanism control processing. Accordingly, the amount of resources used for such processing and processing speed can be suppressed, and various modified type of optical disc apparatuses can be readily developed.

Furthermore, according to embodiment 9, pieces of information recorded on discs having different logical structures are connected or complemented, whereby such information can be automatically reproduced only with the optical disc controller 6. Further still, as for information to be subjected to additional processing, such information is extracted according to a request from the host controller 22 or the type of output means for outputting that information, whereby reproduction of sound and images can be realized.

(Embodiment 10)

Next, the structure and operation of the optical disc apparatus 1 according to embodiment 10 for implementing copyright processing is described.

Figure 21:
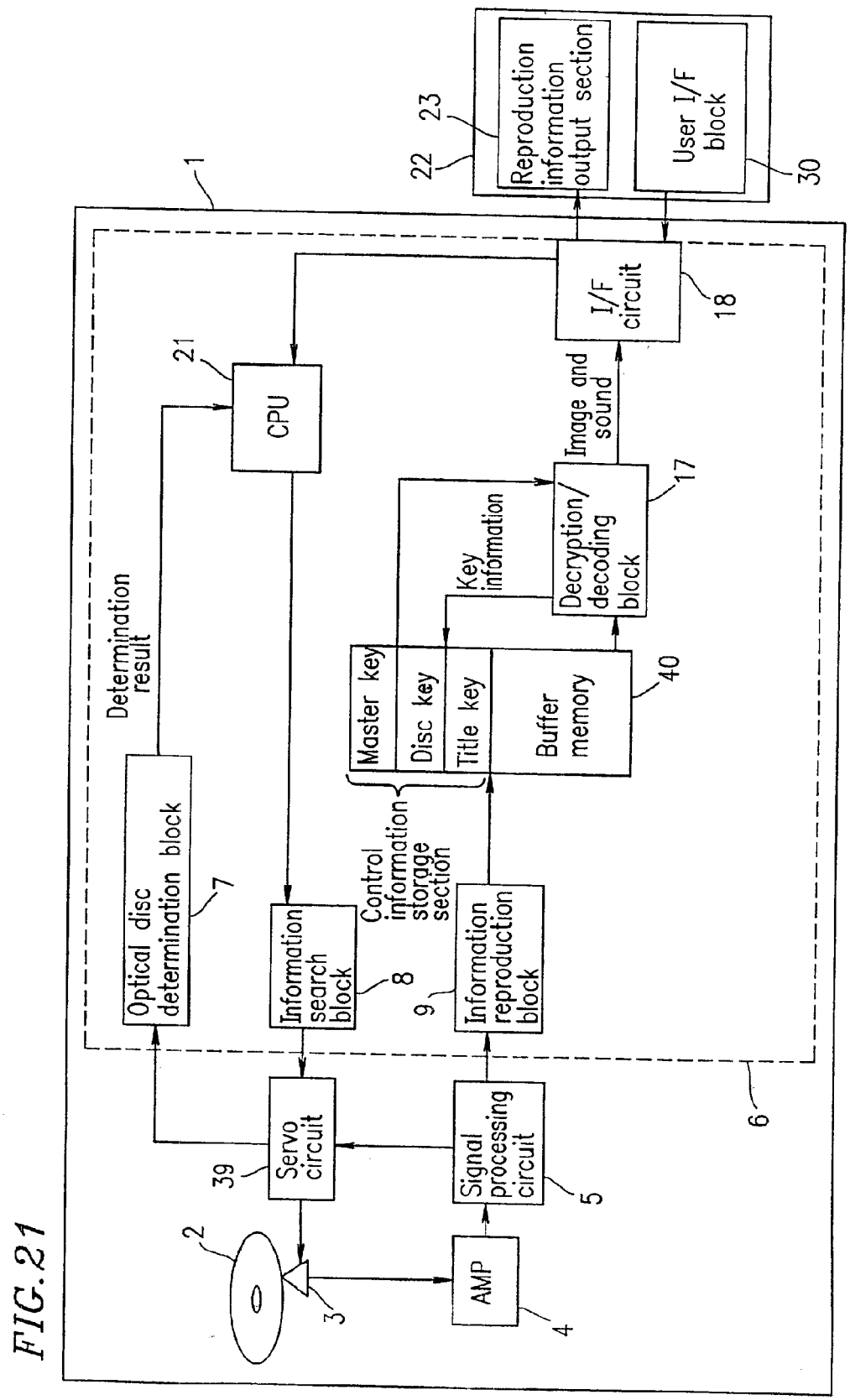
FIG. 21 shows a structure of an optical disc apparatus including an optical disc controller according to embodiment 10 of the present invention.

FIG. 21 shows a structure of the optical disc apparatus 1 including an optical disc controller 6 according to embodiment 10 of the present invention. The optical disc controller 6 controls recording or reproduction of data on an optical disc. The optical disc apparatus 1 of embodiment 10 implements copyright processing.

In embodiment 10, information which has been encrypted based on predetermined key information is stored in the optical disc 2. The optical disc controller 6 further includes a decryption/decoding block (decryption/decoding means) 17 for decoding the encrypted information.

Figure 22:
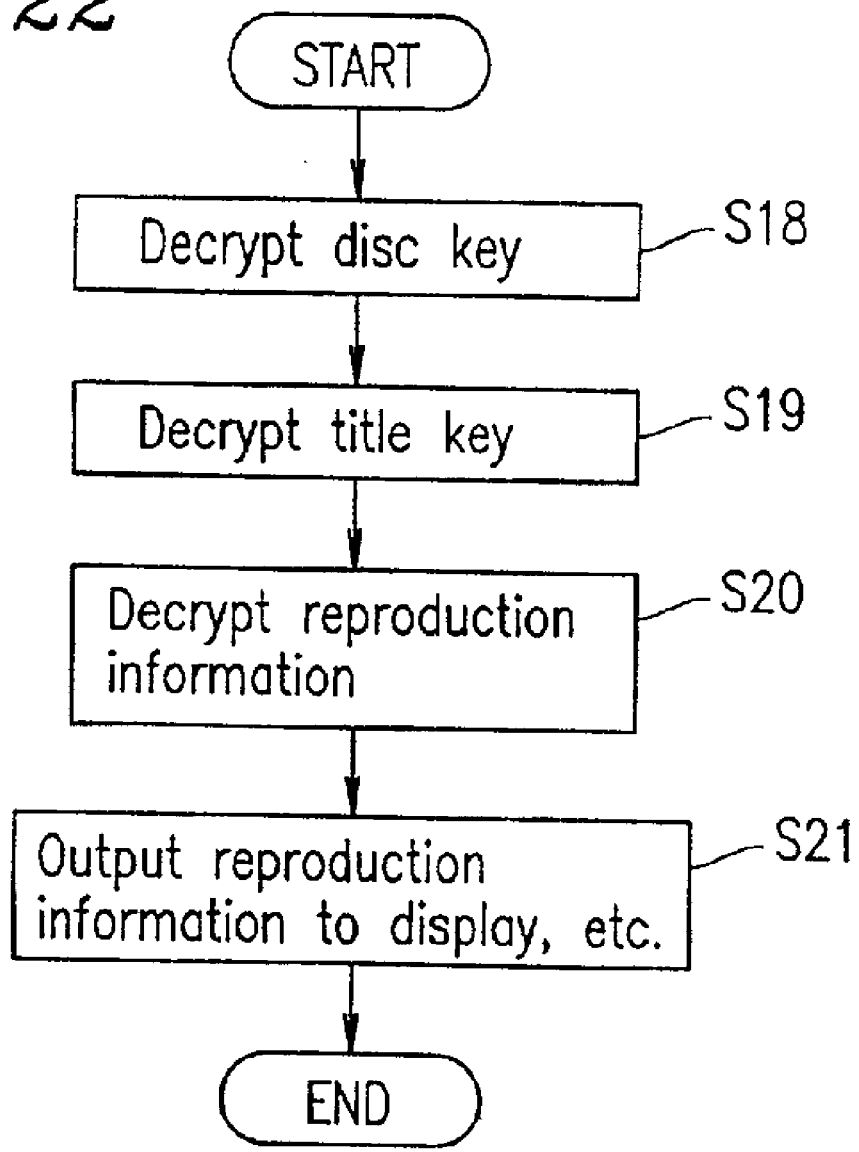
FIG. 22 is a flowchart illustrating operation of an optical disc controller for implementing copyright processing.

FIG. 22 is a flowchart illustrating the operation of the optical disc controller 6 for implementing copyright processing. Hereinafter, the copyright processing is described in detail with reference to FIGS. 21 and 22.

For a DVD-VIDEO disc, a copyright protection system using encryption technology is provided, according to strong demand from cinema industry, as indispensable for preventing production of an illegal copy of cinema information recorded on the disc by a general user on his/her computer. For example, according to the CSS (Contents Scrambling System) which is a copyright protection system adopted in DVD reproduction apparatuses, a master key which corresponds to a manufacturer licensed by the CSS management organization is buried in a control information storage section in the buffer memory 40 of the optical disc apparatus 1 before it is shipped for market.

At the first step, a disc key (an encrypted disc key), which is control information stored in a predetermined region of the optical disc 2 and inherent to the optical disc 2, is read out (Step S18). The information reproduction block 9 outputs the read, encrypted disc key to the decryption/decoding block 17 via the buffer memory 40. The decryption/decoding block 17 performs decryption of a reproduction signal encrypted based on the key information, and decryption processing of the reproduction signal. The decryption/decoding block 17 reads the master key stored in the control information storage section on the buffer memory 40. Then, the decryption/decoding block 17 uses the read master key to decrypt the encrypted disc key previously input to the decryption/decoding block 17, and stores the decrypted disc key in the control information storage section on the buffer memory 40.

Next, at step S19, the decryption/decoding block 17 uses the disc key to decrypt an encrypted title key, and stores the decrypted title key in the control information storage section on the buffer memory 40.

Next, at step S20, when the host controller 22 issues a command to read information of an encrypted title recorded in the optical disc 2 via the user I/F block 30, the information reproduction block 9 outputs information of an encrypted title to the decryption/decoding block 17 via the buffer memory 40. Then, the decryption/decoding block 17 uses the title key to decrypt the information of the encrypted title, and outputs the decrypted information to the reproduction information output section 23 of the host controller 22 via an I/F circuit 18. Then, at step S21, the reproduction information output section 23 outputs the information of the decrypted title to an external apparatus, such as a display or the like.

As described above, the host controller 22 only needs to perform a minimum amount of command issuance processing, error processing, and mechanism control processing. Accordingly, the amount of resources used for such processing and a required processing speed can be suppressed, and various modified types of optical disc apparatuses can be readily developed. Further, processing of a high security level, such as CSS processing (copyright management, illegal copy protection, etc.) based on key information as described above, is incorporated in the optical disc controller 6, whereby encryption mechanism cannot be analyzed using a general-purpose bus monitor or the like. Therefore, highly-reliable copyright management processing, and an apparatus for implementing such processing, can be provided.

(Embodiment 11)

Figure 23:
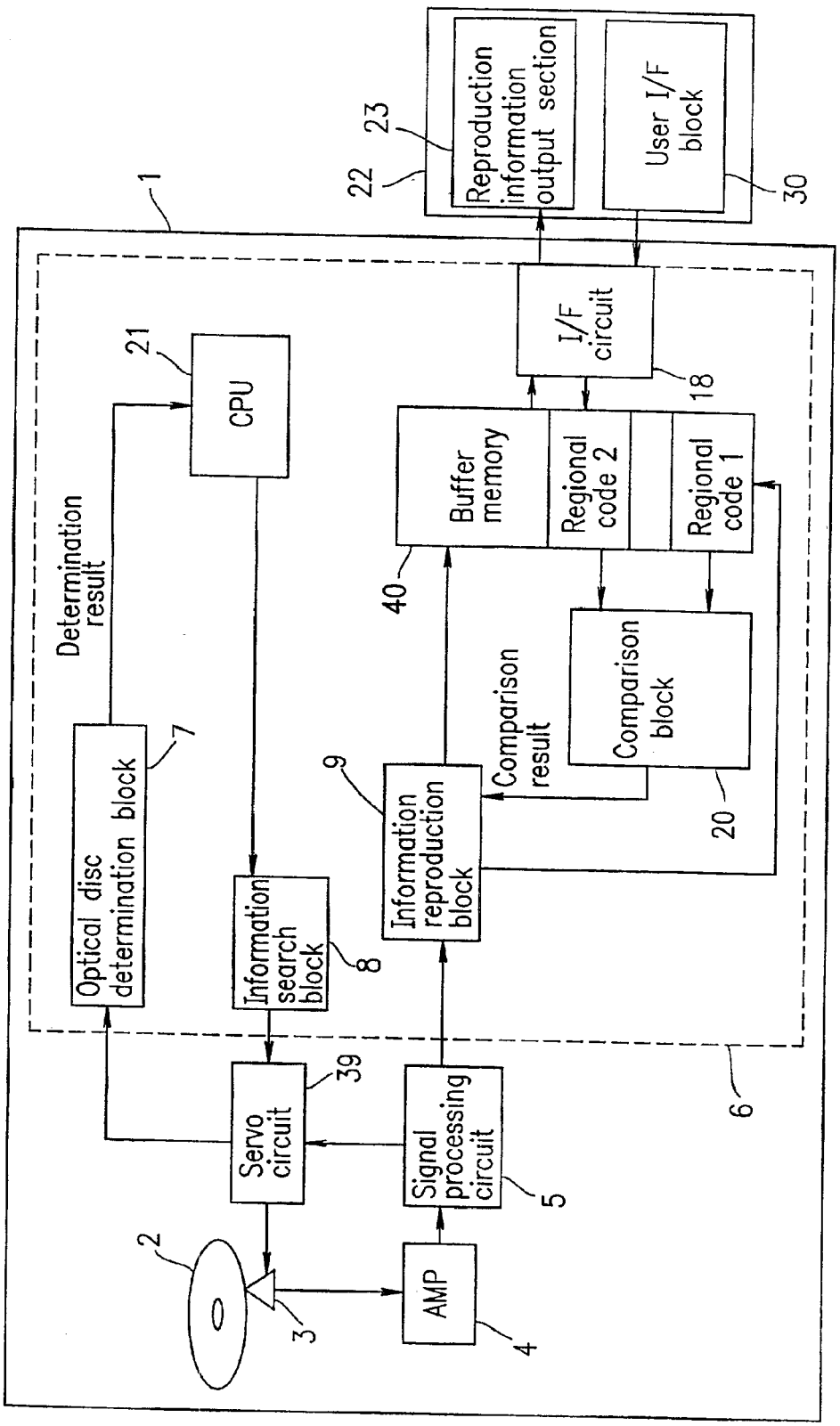
FIG. 23 shows a structure of an optical disc apparatus including an optical disc controller according to embodiment 11 of the present invention.

FIG. 23 shows a structure of an optical disc apparatus 1 including an optical disc controller 6 according to embodiment 11 of the present invention. The optical disc controller 6 controls recording or reproduction of data on an optical disc. In FIG. 23, the structure of the optical disc apparatus 1 is substantially equivalent to that of embodiment 10 except for a comparison block 20. Detailed descriptions of the same components are herein omitted.

In embodiment 11, the optical disc controller 6 further includes the comparison block (comparison means) 20 for comparing control information read from the optical disc 2 with auxiliary control information previously set by the host controller 22 connected to the optical disc controller 6. If the control information read from the optical disc 2 matches with the auxiliary control information, the information reproduction block 9 reproduces the optical disc 2.

Figure 24:
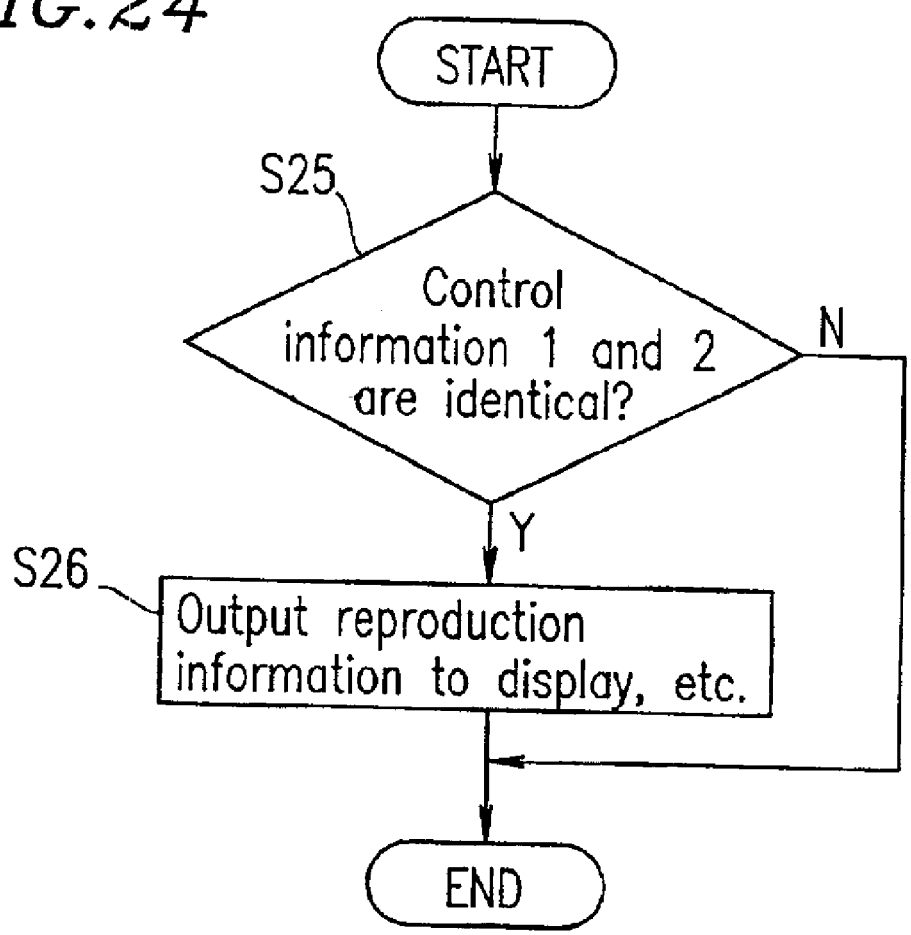
FIG. 24 is a flowchart illustrating operation of an optical disc controller for implementing district-restricted reproduction according to embodiment 11 of the present invention.

A structure of the optical disc controller 6 which implements a district-restricted reproduction feature, which is an essential part of embodiment 11, is described with reference to a flowchart of FIG. 24. The district-restricted reproduction feature allows reproduction of information from the optical disc 2 only in a restricted regional district.

First, a regional code system for protecting a "playright", i.e., a right to play movie information recorded on a disc, is described.

The regional code system is a system for preventing a play of a product (disc) released for a certain regional district in other districts. The entire world is divided into six districts, and regional codes are allocated to the respective districts. For example, when a regional code recorded in a disc and a regional code set in a reproduction apparatus both indicate "for Japan", information recorded in the disc can be reproduced by the reproduction apparatus. Alternatively, when a regional code recorded in a disc indicates "for U.S.A.", and a regional code set in a reproduction apparatus indicates "for Japan", information recorded in the disc cannot be reproduced by the reproduction apparatus.

A first regional code from an optical disc 2, which is first control information necessary for achieving district-restricted reproduction of reproduction information recorded on the optical disc 2, is stored in the buffer memory 40. On the other hand, the user I/F block 30 transmits a second regional code, which is second control information set by a user, to the buffer memory 40 via the I/F circuit 18. The first and second regional codes are input to the comparison block 20, and the comparison block 20 determines whether the first and second regional codes match or not (Step S25). The result of the comparison block 20 is transmitted to the information reproduction block 9.

If the result of the comparison block 20 indicates a match between the first and second regional codes, the information reproduction block 9 outputs reproduction information read from the optical disc 2 to the reproduction information output section 23 via the buffer memory 40. Then, the reproduction information output section 23 outputs the reproduction information to an external apparatus, such as a display or the like (Step S26).

If the result of the comparison block 20 indicates a mismatch between the first and second regional codes, the information reproduction block 9 does not output reproduction information read from the optical disc 2. Instead, the information reproduction block 9 informs the host controller 22 via the buffer memory 40 and the I/F circuit 18 as to the mismatch between the first and second regional codes. Based on such information, the host controller 22 can display an alert message about them is match of the regional codes on a front menu or in an error window on a PC. Further, the host controller 22 can request a user to rewrite a corresponding code of a reproduction application or to replace discs.

As described above, by employing the above features of embodiment 11 of the present invention, the optical disc controller 6 can automatically reproduces a disc mounted on a reproduction apparatus such that information recorded on the disc is reproduced only in an allowed district.

Furthermore, in embodiment 11, both the first and second regional codes are stored in the same buffer memory 40. However, according to the present invention, the first and second regional codes may be stored in different memories.

(Embodiment 12)

Figure 25:
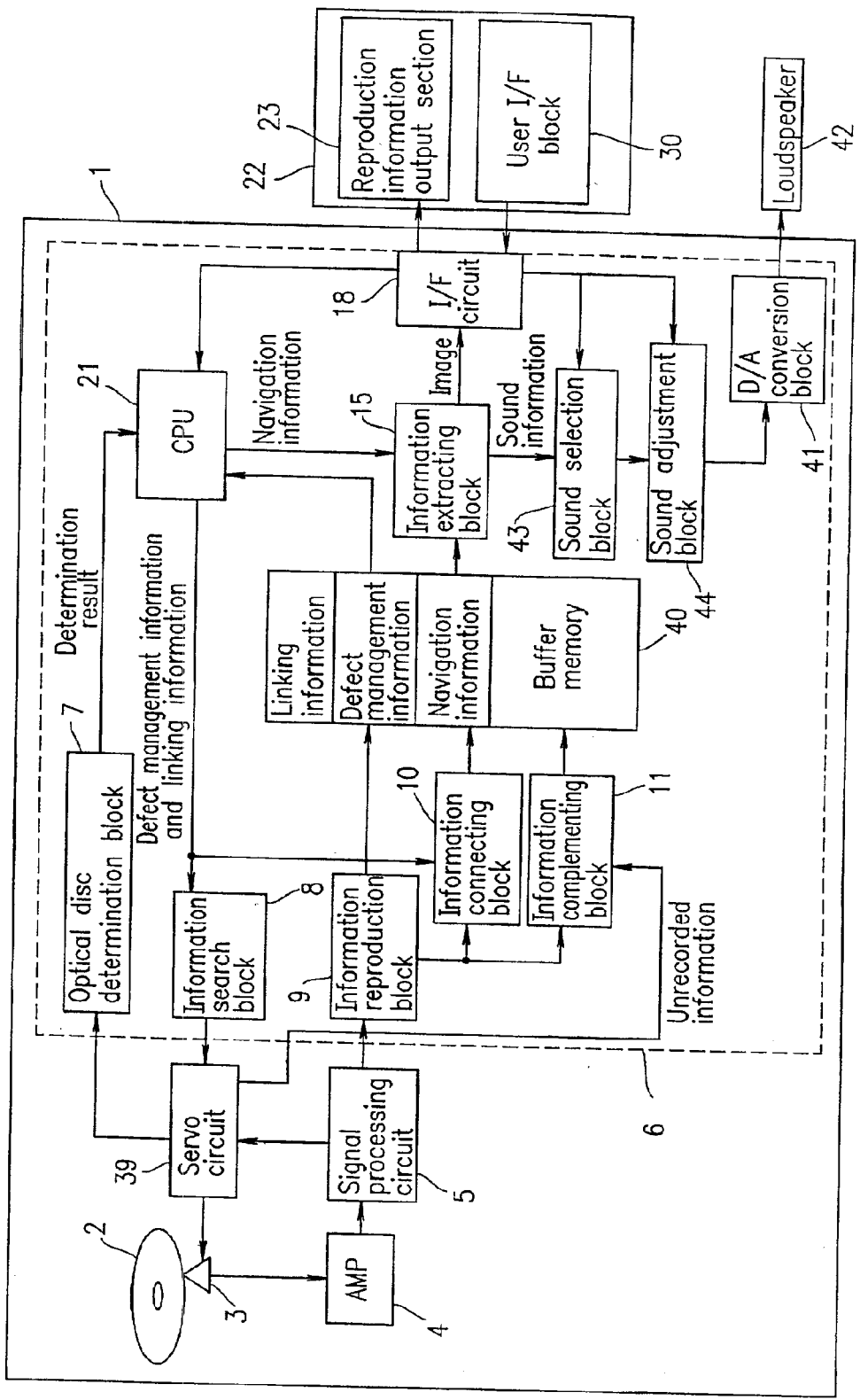
FIG. 25 shows a structure of an optical disc apparatus including an optical disc controller according to embodiment 12 of the present invention.

FIG. 25 shows a structure of an optical disc apparatus 1 including an optical disc controller 6 according to embodiment 12 of the present invention. The optical disc controller 6 controls recording or reproduction of data on an optical disc. In FIG. 25, the structure of the optical disc apparatus 1 is substantially equivalent to that of embodiment 11 except for a sound selection block 43, a sound adjustment block 44, a D/A conversion block 41, and a loudspeaker 42. Detailed descriptions of the same components are herein omitted.

In embodiment 12, the optical disc controller 6 further includes: the sound selection block 43 for selecting sound information of a certain language (e.g., Japanese, English, etc.) from at least one set of sound information extracted from the memory 40 according to an instruction from the host controller 22 connected to the optical disc controller 6; and the sound adjustment block (sound adjustment means) 44 for adjusting the sound information of a certain language selected by the sound selection block 43 so as to have certain volume/sound quality.

Sound information of at least one type of language, which is extracted by the information extracting block 15, is input to the sound selection block 43. Next, a language setting parameter set by a user is transmitted to the sound selection block 43 via the user I/F block 30. According to the language setting parameter, sound information of a certain language is selected from the sound information of at least one type of language. Then, the sound information of a certain language is input to the sound adjustment block 44. On the other hand, a volume/sound quality setting parameter is set by a user and transmitted to the sound adjustment block 44 via the user I/F block 30. The sound information of a certain language is adjusted according to the volume/sound quality setting parameter, so as to have desired volume/sound quality.

Resultant digital sound information adjusted as described above is converted by the D/A conversion block 41 into analog sound information. The analog sound information is output as sound by the loudspeaker 42.

According to embodiment 12, in addition to the above-described sound conversion, sound conversion for a surround speaker system including four separated loudspeakers (e.g., a left-side speaker, a right-side speaker, a front speaker, a rear speaker), activation/deactivation of sound muting, turning ON/OFF of a surround function and a noise reduction function, etc., can be readily achieved by mouse-clicking on a front panel or an application running on a PC. Furthermore, the optical disc controller 6 automatically recognizes a request from the host controller 22, and processing for a requested operation is automatically executed under internal sequence control.

According to the present invention, an optical disc mounted on an optical disc apparatus can be stably reproduced at a high speed regardless of the class and type of the optical disc.

Further, according to the present invention, switching of a general-purpose terminal can be automatically performed according to the class and type of an optical disc. A signal generated according to the class and type of an optical disc can be transmitted.

Furthermore, according to the present invention, setting conditions of a timer can be automatically switched according to the class and type of an optical disc. Even if a synchronization clock is varied by changing discs mounted on an optical disc apparatus, correct linear calculation and determination of standby of a disc rotation operation are possible. Thus, the performance of the optical disc apparatus can be improved without increasing the access time.

Furthermore, according to the present invention, even when a defect is present on an optical disc itself, necessary control information can be acquired.

Furthermore, according to the present invention, even when information to be reproduced is physically disconnected, a disc controller automatically searches and connects such information disconnected due to substituent information for defect information or linking. A host controller or host computer can access a desired region of the optical disc regardless of the class and type of the optical disc. Furthermore, even when a read command is issued for a region where no information is stored (an unrecorded region or a region where error correction impossibility information is stored), such a region is automatically implanted (complemented) with dummy information. With such an arrangement, occurrence of an error in the host controller or host computer can be prevented, and validity of data can be maintained.

Furthermore, according to the present invention, processing of a high security level can be performed. Thus, the encryption mechanism cannot be analyzed using a general-purpose bus monitor or the like. Therefore, highly-reliable copyright management processing, and an apparatus for implementing such processing, can be provided.

Furthermore, according to the present invention, information recorded on an optical disc mounted on an optical disc apparatus can be reproduced only in an allowed district.

Furthermore, an optical disc controller automatically recognizes a request from a host controller, and processing for a requested operation is automatically executed under internal sequence control.

Further still, according to the present invention, resources are optimally arranged in an optical disc controller of an optical disc apparatus, whereby a reproduction (or recording) process for different types of optical discs can be achieved with a limited amount of resources. In addition, a function which is achieved with software executed by a CPU in a conventional apparatus can be automatically performed by an optical disc controller. Therefore, a common CPU software can be employed regardless of the class and type of an optical disc on which information is reproduced (or recorded). Accordingly, the amount of programs for the CPU and the man-hour for development can be reduced, and a high-performance, highly-reliable optical disc apparatus which accepts various types of optical discs can be developed within a short period of time.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical disc controller for controlling recording or reproduction of an optical disc, comprising:
    a rewritable memory for storing information necessary for recording or reproduction of the optical disc;
    a determination section for determining a class and type of the optical disc;
    a search section for searching for a region of the optical disc in which control information is recorded based on a determination result of the determination section;
    a reproduction section for reproducing the control information recorded in the region searched by the search section; and
    a memory control section for changing an arrangement of the memory based on at least one of the determination result and the control information reproduced by the reproduction section.

2. An optical disc controller according to claim 1, wherein:
    the control information includes the control information necessary for reproduction of the optical disc;
    the optical disc controller further includes a reproduction information type determination section for determining a type of the control information necessary for reproduction of the optical disc; and
    the memory control section controls the reproduction section such that the control information necessary for reproduction of the optical disc is stored in the memory, based on a determination result of the reproduction information type determination section when a reproduction speed of the optical disc is lower than a predetermined speed.

3. An optical disc controller according to claim 1, further comprising an error measurement section for measuring an error rate, or the number of times of error correction, during reproduction of the control information, wherein
    the memory control section allocates a portion of the memory to a ring buffer which is set based on a measurement result of the error measurement section.

4. An optical disc controller according to claim 1, wherein:
    the memory includes a first memory and a second memory, an access speed of the first memory being faster than that of the second memory; and
    the memory control section allocates the first memory to a storage region for the control information, and allocates the second memory to a ring buffer.

5. An optical disc controller according to claim 1, further comprising:
    a general-purpose terminal which functions as an input terminal or output terminal; and
    a general-purpose terminal control section for controlling the general-purpose terminal,
    wherein the general-purpose terminal is connectable to a plurality of circuits, and
    the memory control section controls the general-purpose terminal control section such that the general-purpose terminal is connected to a certain one of the plurality of circuits based on the determination result.

6. An optical disc controller according to claim 1, further comprising:
    a timer; and
    a timer control section for controlling the timer,
    wherein the memory control section controls the timer control section such that a time interval between timer counts of the timer, an interruption preset value, or a reset condition, is changed according to the determination result of the determination section.

7. An optical disc controller according to claim 1, wherein the reproduction section outputs the control information reproduced by the reproduction section to the memory according to the determination result.

8. An optical disc controller according to claim 1, further comprising an information connecting section for connecting a defect portion or discontinued portion of user data stored in the memory,
    wherein the control information includes defect management information for repairing the defect portion of the user data or linking information for repairing the discontinued portion of the user data, and
    the memory control section controls the information connecting section such that the discontinued portion of the user data is connected using the defect management information or the linking information.

9. An optical disc controller according to claim 8, further comprising an information complementing section for complementing an unrecorded portion of the user data,
    wherein the information complementing section complements the unrecorded portion of the user data with certain dummy information.

10. An optical disc controller according to claim 8, further comprising an information extraction section for extracting information from the memory,
    wherein the information extraction section extracts information from the memory according to the determination result or an instruction from a host controller connected to the optical disc controller.

11. An optical disc controller according to claim 1, wherein:

the optical disc stores information which is encrypted based on predetermined key information; and the optical disc controller further includes a decryption/decoding section for decrypting/decoding the encrypted information.

12. An optical disc controller according to claim 1, further comprising a comparison section for comparing the control information read from the optical disc with auxiliary control information which is previously set by a host controller connected to the optical disc controller, wherein if the control information matches with the auxiliary control information, the reproduction section reproduces the optical disc.

13. An optical disc controller according to claim 10, further comprising:

a sound selection section for selecting, according to an instruction from a host controller connected to the optical disc controller, sound information of a certain language from at least one sound information extracted from the memory; and a sound adjustment section for adjusting the sound information of the certain language selected by the sound selection section so as to have a desired volume/sound quality.

14. An optical disc apparatus, comprising:

an optical pickup for emitting a light beam onto an optical disc and detecting a reflected light beam from the optical disc as a signal;

a signal processing circuit for performing certain processing on the signal from the optical pickup;

a servo circuit for moving the optical pickup; and the optical disc controller recited in claim 1 for receiving a processed signal from the signal processing circuit and controlling the servo circuit according to the received signal.

* * * * *